US010191597B2

(12) United States Patent
Khazeni et al.

(10) Patent No.: US 10,191,597 B2
(45) Date of Patent: Jan. 29, 2019

(54) MODULATING A REFERENCE VOLTAGE TO PREFORM CAPACITIVE SENSING

(71) Applicant: SYNAPTICS INCORPORATED, San Jose, CA (US)

(72) Inventors: Kasra Khazeni, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 213 days.

(21) Appl. No.: 14/788,646

(22) Filed: Jun. 30, 2015

(65) Prior Publication Data

US 2017/0003779 A1  Jan. 5, 2017

(51) Int. Cl.
G06F 3/044 (2006.01)
G06F 3/041 (2006.01)

(52) U.S. Cl.
CPC ............ G06F 3/044 (2013.01); G06F 3/0412 (2013.01); G06F 3/0416 (2013.01)

(58) Field of Classification Search
CPC ...... G06F 3/044; G06F 3/0412; G06F 3/0416; G06F 3/04
See application file for complete search history.

(56) References Cited

U.S. PATENT DOCUMENTS 5,945,980 A      8/1999   Moissev et al.
6,954,868 B2 *  10/2005   Lin ...................... G06F 1/3259
                                            713/324
7,859,521 B2    12/2010   Hotelling et al.
8,054,300 B2    11/2011   Bernstein
8,125,463 B2     2/2012   Hotelling et al.
8,243,027 B2     8/2012   Hotelling et al.
8,258,986 B2     9/2012   Makovetskyy
8,305,359 B2    11/2012   Bolender et al.
2003/0052867 A1  3/2003   Shigetaka et al.
2003/0103043 A1  6/2003   Mulligan et al.
2003/0234771 A1 12/2003   Mulligan et al.
2004/0125087 A1  7/2004   Taylor et al.
2004/0239650 A1 12/2004   Mackey
2004/0252109 A1 12/2004   Trent et al.
2005/0030048 A1  2/2005   Bolender et al.
2006/0114240 A1  6/2006   Lin
2006/0114241 A1  6/2006   Lin
2007/0229466 A1 10/2007   Peng et al.
2007/0229468 A1 10/2007   Peng et al.
2007/0229469 A1 10/2007   Seguine
2007/0229470 A1 10/2007   Snyder et al.
2008/0062140 A1  3/2008   Hotelling et al.
2008/0062147 A1  3/2008   Hotelling et al.
2008/0157782 A1  7/2008   Krah
2008/0158183 A1  7/2008   Hotelling et al.

(Continued)

Primary Examiner — Lun-Yi Lao
Assistant Examiner — Jarurat Suteerawongsa
(74) Attorney, Agent, or Firm — Patterson + Sheridan, LLP

(57) ABSTRACT

This disclosure generally provides an input device modulates a reference voltage used to provide power to a plurality of power supplies and acquires, while modulating the reference voltage, first resulting signals from a plurality of sensor electrodes simultaneously at a central receiver. In input device also acquires second resulting signals from the sensor electrodes at a plurality of local receivers and mitigates an effect a grounding condition has on the second resulting signal using the first resulting signals.

19 Claims, 12 Drawing Sheets

(56) References Cited

U.S. PATENT DOCUMENTS

| | | |
|---|---|---|
| 2008/0246723 A1 | 10/2008 | Baumbach |
| 2009/0284495 A1 | 11/2009 | Geaghan et al. |
| 2010/0001973 A1 | 1/2010 | Hotelling et al. |
| 2010/0060608 A1 | 3/2010 | Yousefpor |
| 2010/0144391 A1 | 6/2010 | Chang et al. |
| 2010/0164889 A1 | 7/2010 | Hristov et al. |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0245286 A1 | 9/2010 | Parker |
| 2010/0292945 A1 | 11/2010 | Reynolds et al. |
| 2011/0006832 A1 | 1/2011 | Land et al. |
| 2011/0006999 A1 | 1/2011 | Chang et al. |
| 2011/0007030 A1 | 1/2011 | Mo et al. |
| 2011/0025629 A1* | 2/2011 | Grivna ................ G06F 3/0416 345/173 |
| 2011/0025635 A1 | 2/2011 | Lee |
| 2011/0061949 A1 | 3/2011 | Krah et al. |
| 2011/0242444 A1 | 10/2011 | Song |
| 2011/0248949 A1 | 10/2011 | Chang et al. |
| 2011/0298746 A1 | 12/2011 | Hotelling |
| 2012/0038585 A1 | 2/2012 | Kim |
| 2012/0043971 A1 | 2/2012 | Maharyta |
| 2012/0044171 A1 | 2/2012 | Lee et al. |
| 2012/0081335 A1 | 4/2012 | Land et al. |
| 2012/0218199 A1 | 8/2012 | Kim et al. |
| 2012/0306811 A1* | 12/2012 | Farmer ................ G06F 1/3218 345/174 |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0172311 A1 | 7/2013 | Harter et al. |
| 2013/0181942 A1* | 7/2013 | Bulea ................ G06F 3/044 345/174 |
| 2013/0215075 A1 | 8/2013 | Lee et al. |
| 2013/0321296 A1 | 12/2013 | Lee et al. |
| 2013/0342770 A1 | 12/2013 | Kim et al. |
| 2014/0267137 A1* | 9/2014 | Solven ................ G06F 3/0416 345/174 |
| 2015/0220138 A1* | 8/2015 | Jones ................ H04L 12/2803 713/323 |
| 2015/0378465 A1* | 12/2015 | Shih ................ G06F 3/044 345/174 |
| 2016/0054853 A1* | 2/2016 | Hu ................ G06F 3/0412 345/174 |
| 2017/0068388 A1* | 3/2017 | Kim ................ G06F 3/044 |
| 2017/0235413 A1* | 8/2017 | Koizumi ................ G06F 3/0416 345/174 |

* cited by examiner

MODULATING A REFERENCE VOLTAGE TO PREFORM CAPACITIVE SENSING

BACKGROUND

Field

Embodiments of the present invention generally relate to electronic devices, and more specifically, to modulating reference voltages to perform capacitive sensing.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein includes an input device that includes a plurality of sensor electrodes and a processing system. The processing system includes a reference voltage modulator configured to modulate a reference voltage used to provide power to a plurality of power supplies and a central receiver configured to, when the reference voltage is being modulated, acquire first resulting signals from the plurality of sensor electrodes simultaneously. The processing system also includes a plurality of local receivers each coupled to at least one of the sensor electrodes, where the local receivers are configured to acquire second resulting signals from the sensor electrodes. The processing system is configured to mitigate an effect a grounding condition has on the second resulting signal using the first resulting signals.

Another embodiment described herein includes a processing system that includes a reference voltage modulator configured to modulate a reference voltage used to provide power to a plurality of power supplies and a central receiver configured to, when the reference voltage is being modulated, acquire first resulting signals from a plurality of sensor electrodes simultaneously. The processing system also includes a plurality of local receivers configured to acquire second resulting signals from the plurality of sensor electrodes, wherein the processing system is configured to mitigate an effect a grounding condition has on the second resulting signals using the first resulting signals.

Another embodiment described herein includes a method that includes modulating a reference voltage used to provide power to a plurality of power supplies and acquiring, while modulating the reference voltage, first resulting signals from a plurality of sensor electrodes simultaneously at a central receiver. The method also includes acquiring second resulting signals from the sensor electrodes at a plurality of local receivers and mitigating an effect a grounding condition has on the second resulting signal using the first resulting signals.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
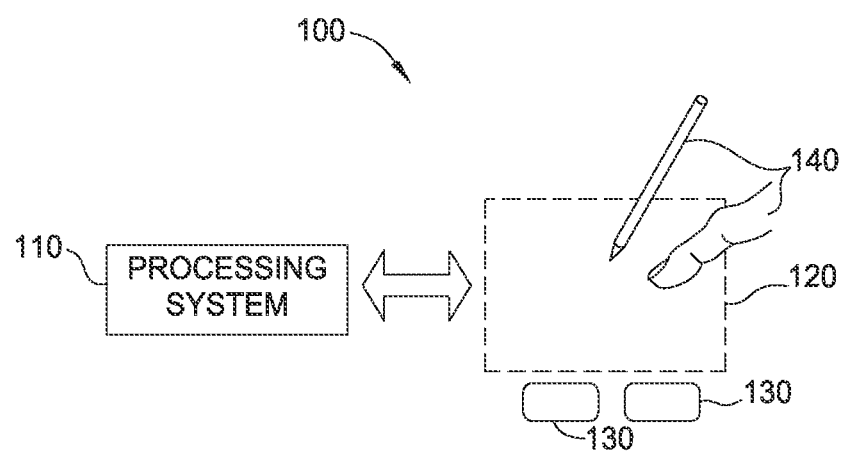
FIG. 1 is a block diagram of an exemplary system that includes an input device in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide an input device that includes a reference voltage modulator that modulates reference voltage rails when performing capacitive sensing. In one embodiment, reference voltage rails are coupled to a DC power source which provides power to operate a panel that includes a display screen integrated with a touch sensing region. Before performing capacitive sensing, the input device may isolate the DC power source from the reference voltage rails and use the reference voltage rails to modulate the rails—e.g., $V_{DD}$ and $V_{GND}$. For example, the reference voltage modulator may cause the voltages on the rails to change by the same increment. That is, if a high reference rail (e.g., $V_{DD}$) increases by 1V, the reference voltage modulator also increases a low reference rail (e.g., $V_{GND}$) by 1V. In this example, the voltage difference between the reference voltage rails remains constant as the rails are modulated. As used herein, isolating the reference voltage rails may not require the physically disconnecting the rails from the power source. Instead, the reference voltage rails may be inductively or capacitively coupled to the power source.

In one embodiment, the reference voltage rails are modulated (and capacitive sensing is performed) when the input device is in a low power state. In one example, the display/sensing panel (and a backlight, if applicable) is turned off and does not draw power. Nonetheless, by modulating the reference voltage rails, display and sensor electrodes in the display/sensing panel can be used to perform capacitive sensing. Stated differently, by modulating the reference voltage rails, an input object (e.g., a finger) capacitively coupled to the display and sensor electrodes in the panel can be detected by measuring a change in capacitance. Once the input object is detected, the input device wakes up, switching from the low power state to an active state.

In one embodiment, when performing capacitive sensing by modulating the reference voltage rails, the display and sensor electrodes are treated as one capacitive pixel or electrode. As such, by measuring resulting signals from the display and sensor electrodes, the input device determines whether an input object is proximate to the panel but does not determine a particular location on the panel where the input object is contacting or hovering over. Instead, once in the active state, the input device may perform a more granular type of capacitive sensing technique that identifies a particular location of the input object in a sensing region. When performing capacitive sensing in the active state, the input device may drive DC voltages onto the reference voltage rails—i.e., the rails are unmodulated or the rails are modulated but without sensing the current or charge require to do so.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer.

During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
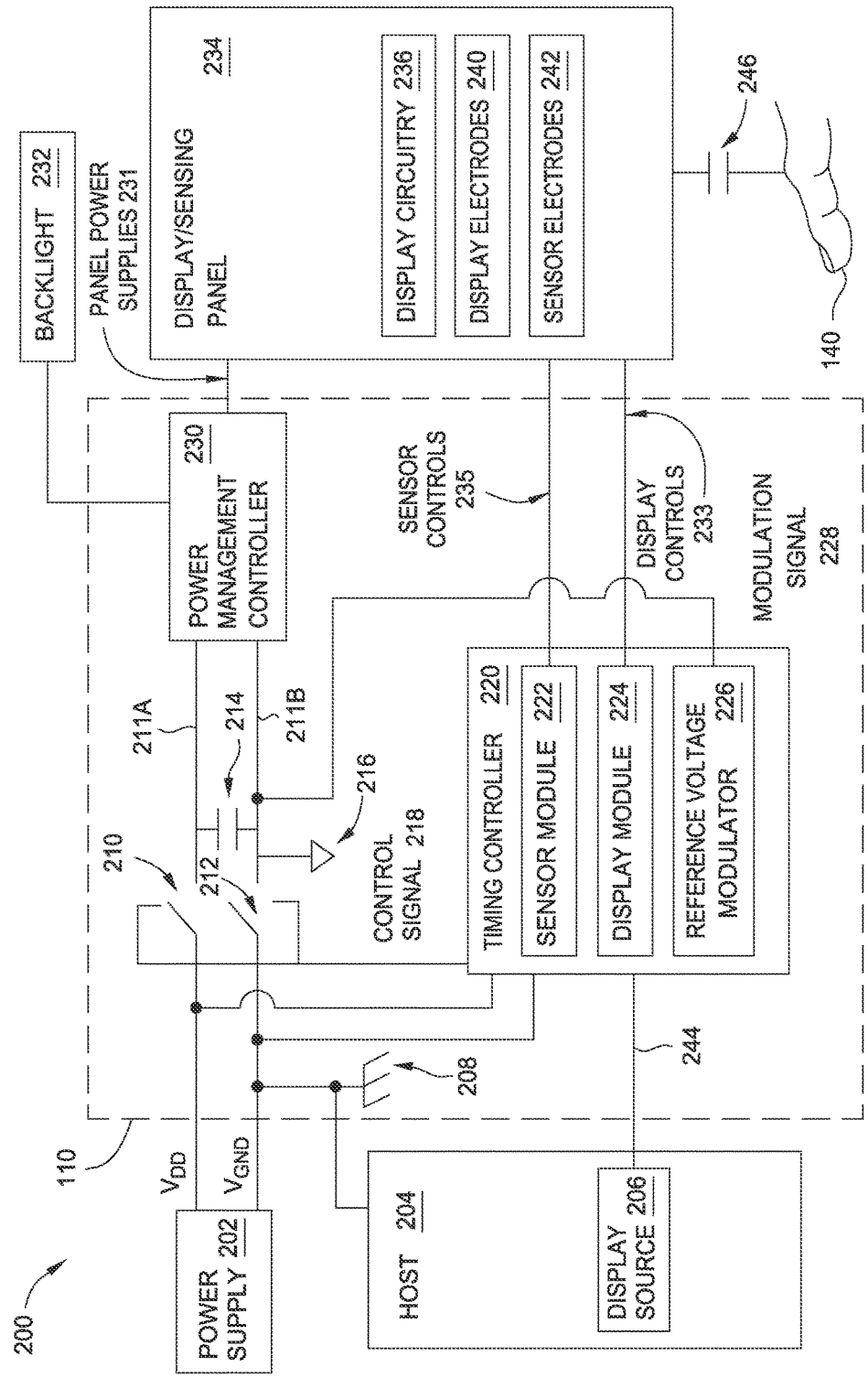
FIG. 2 is an input device that modulates reference voltage rails for performing capacitive sensing, according to one embodiment described herein.

FIG. 2 is an input device 200 that modulates reference voltage rails for performing capacitive sensing, according to one embodiment described herein. The input device 200 includes a power supply 202, a host 204, the processing system 110, backlight 232, and display/sensing panel 234. In one embodiment, the power supply 202 is a DC power source that outputs at least two reference voltages —$V_{DD}$ and $V_{GND}$—which provide power to the processing system 110, backlight 232, and display/sensing panel 234. The power supply 202 may be a battery or a power converter that is plugged into an external power source (e.g., a AC or DC electrical grid). As used herein, the low reference voltage (i.e., $V_{GND}$) is also referred to as chassis ground 208 to indicate it is the reference voltage for the input device 200. In contrast, other power domains in the input device 200 may include local ground references (e.g., local ground 216) which may be the same voltage as chassis ground 208 or a different voltage. For example, as described below, at some time periods, the local ground 216 may be the same voltage as the chassis ground 208 but at other time periods is modulated by being driven to different voltages.

In one embodiment, the host 204 represents a general system of the input device 200 that that performs any number of functions such as placing phone calls, transmitting data wirelessly, executing an operating system or applications, and the like. The host 204 includes a display source 206 which provides updated data frames to the processing system 110. For example, the display source 206 may be a graphic processing unit (GPU) which transmits pixel or frame data to the processing system 110 in order to update a display on the display/sensing panel 234. To provide the updated display data, display source 206 is coupled to the processing system 110 via a high-speed link 244 which may transmit data at speeds greater than or equal to 1 Gbit per second at the full frame rate. For example, the display source 206 may use DisplayPort™ (e.g., eDP) or MIPI® display interfaces to communicate display data on the high-speed link 244. This interface may include a single pair (e.g., differential) or multiple wire physical connections—e.g., a three wire signaling, multiple links with a shared clock, embedded clock, three level signaling, etc.).

The processing system 110 includes switches 210, 212, a timing controller 220, and a power management controller 230. The switches 210, 212 selectively couple reference voltage rails 211A, 211B to the power supply 202. Using control signal 218, the timing controller 220 can open and close the switches 210, 212 thereby electrically connecting and disconnecting the reference voltage rails 211 to the power supply 202. Although shown as an ohmic connection, in other embodiments, the reference voltage rails 211 may be capacitively or inductively coupled to the power supply 202. In any case, the switches 210, 212 can be used to disconnect the reference voltage rails 211 from the power supply 202 while the modulation signal 228 may be used to modulate the voltage rails.

When the switches 210, 212 are closed, the power supply 202 charges a bypass capacitor 214. When the switches 210, 212 are open, the charge stored on the bypass capacitor 214 can be used to power the reference voltage rails 211 which are then used to power various components in the input device 200 (e.g., power management controller 230, backlight 232, or panel 234). In one embodiment, the timing controller 220 may periodically open and close the switches 210, 212 using control signal 218 to maintain a substantially constant, average voltage across the capacitor 214 and the rails 211. Alternatively, a separate controlling element (e.g., flyback inductor) may control the voltage across the capacitor 214 while the timing controller 220 modulates the reference voltage rails 211 using signal 228.

The timing controller 220 includes a sensor module 222, display module 224, and reference voltage modulator 226. The sensor module 222 is coupled to the display/sensing panel 234, and more specifically, may be coupled to sensor electrodes 242 in the panel 234 directly or through modulation signal 228. Using the sensor electrodes 242, the sensor module 222 performs capacitive sensing in the sensing region 120 shown FIG. 1 which may include the sensor electrodes 242. As discussed above, the sensor module 222 may use self-capacitance, mutual capacitance, or a combination of both to identify a particular location in the sensing region 120 where an input object is contacting or hovering over.

The display module 224 is coupled to display circuitry 236 (e.g., source drivers and gate selection logic) and display electrodes 240 (e.g., source electrodes, gate electrodes, common electrodes) for updating a display in the panel 234. For example, based on the display data received from the display source 206, the display module 224 iterates through the rows of the display using gate electrodes and updates each of the display pixels in the selected row using source electrodes. In this manner, the display module 224 can receive updated display frames from the host 204 and update (or refresh) the individual pixels in the display/sensing panel 234 accordingly.

The reference voltage modulator 226 outputs a modulation signal 228 that modulates the reference voltage rails 211. In one embodiment, the reference voltage modulator 226 only modulates the voltage rails 211 when the rails 211 are disconnected from the power supply 202 (i.e., the switches 210, 212 are open). Doing so allows the modulation signal 228 to modulate the reference voltage rails 211 relative to the power supply 202 outputs—i.e., $V_{DD}$ and $V_{GND}$. If the power supply 202 was not electrically disconnected when the reference voltage rails 211 are modulated, $V_{DD}$ and $V_{GND}$ may be shorted out by the modulation signal 228 which may cause other components in the input device 200 that rely on the power supplied by the power supply 202 to behave unpredictably or improperly. For example, the host 204 (or other components in the input device 200 not shown) may also use the power supply 202 to power its components. The host 204 may be designed to operate with unmodulated power supplies, and thus, if the modulation signal 228 were not electrically isolated from power supply 202 the signal 228 may have a negative effect on host 204.

In one embodiment, the modulation signal 228 modulates the reference voltage rails by increasing or decreasing the voltages on these rails in a discrete quantified or periodic manner. In one example, the modulation signal 228 causes the same or similar voltage change on both voltage rails 211A and 211B such that the voltage difference between the rails 211 remains substantially constant. For example, if $V_{DD}$ is 4V and $V_{GND}$ is 0V, the modulation signal may add a 1V voltage swing on both rails such that voltage rail 211A changes between 5 and 3V, while voltage rail 211B changes between −1 and 1V. Nonetheless, the voltage difference between the rails 211 (i.e., 4V) remains the same. Moreover, the modulation signal 228 may be a periodic signal (e.g., a sine or square wave) or a non-periodic signal where the modulation is not performed using a repetitive signal. In one embodiment, the capacitive sensing measurement is demodulated in a manner to match the modulation waveform of the modulation signal 228.

By modulating the reference voltage rails 211 relative to chassis ground, from the perspective of the processing system 110, it appears as if the outside world and the input objects coupled to the chassis have voltage signals that is modulating. That is, to the powered systems in the processing system 110, it appears its voltage is stable and the rest of the world is modulating which includes any input object proximate to the panel 234 and the other components in the input device 200 not coupled to the modulated reference voltage rails 211. One advantage of modulating the reference voltage rails 211 is that all the components coupled to the rails 211 are modulated by the modulation signal 228. Thus, a separate modulation signal does not need to be driven on the display electrodes 240, display circuitry 236, or power management controller 230 in order to guard these electrodes so they do not interfere with capacitive sensing. Put differently, the voltage difference between the electrodes used to perform capacitive sensing and the various components in the display panel 234 does not change. Thus, even if the electrodes and the components in the panel 234 are capacitively coupled, this coupling capacitance does affect the resulting signal generated on the electrodes. Moreover, standard components can be used—i.e., the display circuitry 236 and power management controller 230 do not need to be modified to perform guarding.

The power management controller 230 (e.g., one or more power management integrated circuits (PMICs)) provides the various voltages for powering the display circuitry 236 in the display/sensing panel 234 and the backlight 232 via panel power supplies 231. The power management controller 230 may include a plurality of different power supplies that supply various voltages (e.g., TFT gate voltages VGH, VHL, source voltages, VCOM, etc.). To generate the various voltages, the power supplies may be switched power supplies that use inductive boost circuits or capacitive charge pumps to change the DC voltage provided by the reference voltage rails 211 into DC voltage desired by the backlight 232 or the circuitry in the panel 234. The power supplies may also include buck circuits which efficiently power low voltage digital circuits such as gigabit serial links.

In one embodiment, the reference voltage modulator 226 may modulate the voltage rails 211 when the input device 200 is in a low-power state. In a mobile device such as a smartphone with a LCD display, most of the power consumed by the display system is consumed by the backlight 232, the display module 224, and the display circuitry 236. In one example, the backlight 232, when on, draws 1-3 W, while the display module 224 and display circuitry 236 draw 0.5 to 1 W. In contrast, the sensor module 222 may draw 50-150 mW when performing capacitive sensing. Thus, power consumption can be greatly reduced if both the backlight 232 and display module 224 are deactivated when in the low power state. In one embodiment, the backlight 232 and the display module 224 are not powered while the reference voltage rails 211 are modulated.

However, when the sensor and display modules 222, 224 are located on the same integrated circuit, it may be impossible to deactivate the display module 224 using display control signals 233 and still perform capacitive sensing using sensor module 222 and sensor control signals 235. In this example, if the input device relies on capacitive sensing performed by the sensor module 222 to determine when to wake up from the low-power state (i.e., determine when the user's finger approaches the panel 234), the display module 224 must also be active, which means the input device 200 does not benefit from the power savings of deactivating the display module 224. In contrast, input device 200 shown in FIG. 2 can perform capacitive sensing without powering the isolated sensor module 222 when in the low power state and thus benefit from the power savings of being able to deactivate both the sensor module 222 and the display module 224. Thus, in the low-power state, the sensor module 222, display module 224, power management controller 230, backlight 232, and the display sensing circuitry 236 can each be deactivated.

To perform capacitive sensing in the low-power state when the sensor module 222 is deactivated, in one embodiment, the reference voltage modulator 226 may include circuitry for acquiring signals—i.e., resulting signals—from the display and sensor electrodes 240, 242 resulting from modulating at least one of the voltage rails 211. To do so, the reference voltage modulator 266 includes a separate receiver (not shown in FIG. 2) for measuring the resulting signals. In addition, the reference voltage modulator 266 may have other circuitry such as a filter (analog or digital) and an analog to digital converter (ADC) for sampling the resulting signals. Based on measuring changes in a coupling capacitance 246 between an input object 140 and the display/sensing panel 234, the input device 200 can detect the proximity of an input object near or contacting the panel 234. In one embodiment, the resulting signals are acquired from both display electrodes 240 and sensor electrodes 242 simultaneously. The display and sensor electrodes 240, 242 may be coupled by the panel 234 to the reference voltage rails 211. For example, the display and sensor electrodes 240, 242 are coupled to the power management controller 230 which provides power for display updating (e.g., gate line voltage, Vcom voltage, source voltage) and capacitive sensing (e.g., voltages to power receivers coupled to individual sensor electrodes 242). In turn, the power management controller 230 receives its power via the reference voltage rails 211. Thus, the display and sensor electrodes 240, 242 (as well as other components in the panel 234) are coupled to a common electrical node as the reference voltage modulator 226 (i.e., the same electrical node where the modulation signal 228 couples to the voltage rail 211B). Thus, when modulating the reference voltages 211, this modulates the power supplies in the power management controller 230 which in turn modulates the various components in the panel 234—e.g., the display and sensor electrodes 240, 242—allowing the input device 200 to measure user inputs.

Because the reference voltage modulator 226 is also coupled to this common node, the modulator 226 may acquire the resulting signals from the display and sensor electrodes 240, 242 simultaneously when modulating the reference voltage rails 211. Put differently, the reference voltage modulator 226 does not need to separately acquire resulting signals from the various electrodes in the panel 234 at different time periods, but rather acquires the combined resulting signals from all the coupled electrodes in parallel. By acquiring the resulting signals simultaneously, the panel 234 may considered as a single large capacitive pixel or electrode. As an input object approaches any portion or location in the panel 234, the display and sensor electrodes 240, 242 in that portion generate resulting signals that indicate a change in capacitance (e.g., self-capacitance) caused by the proximity of the input object. Thus, in one embodiment, by evaluating the resulting signals acquired by the reference voltage modulator 226, the input device 200 can determine whether an input object is proximate to the panel 234. However, because the panel is one capacitive electrode (rather than a plurality of separate capacitive electrodes or pixels) the device 200 may be unable to identify a specific portion or location in the panel 234 where the input object is located.

In one embodiment, instead of using both display and sensor electrodes 240, 242 for performing capacitive sensing when modulating the reference voltage rails 211, the reference voltage modulator 226 may acquire resulting signals from only the display electrodes 240 or only the sensor electrodes 242. As long as the electrodes coupled to the reference voltage modulator substantially cover the entire region of the panel 234, the input device 200 can detect an input object regardless of the particular location of the object in the panel 234.

Once an input object is detected, the input device 200 may switch from the low power state to an active state where modulated signals are received during a display update time. For example, the input device 200 may activate the sensor module 222 to perform a different capacitive sensing technique. Unlike the capacitive sensing performed using the reference voltage modulator 226, this capacitive sensing technique may logically divide a sensing region of the panel 234 into a plurality of capacitive pixels. By determining which capacitive pixel (or pixels) have an associated capacitance changed by the input object, the input device can determine a specific location or region of the panel 234 where the input object is contacting or hovering over. As mentioned above, the sensor module 222 may use self-capacitance sensing, mutual capacitance sensing, or some combination thereof to identify the location of the input object in the sensing region.

In one embodiment, the reference voltage rails 211 are always isolated (e.g., inductively or capacitively) from the power supply 202, and thus, do need to be selectively disconnected from the power supply 202 before being modulated as described above. Instead, the processing system 110 and display/sensing panel 234 may have a separate, individual power supply (e.g., a separate battery or charged capacitor inductively coupled to a power) coupled to the reference voltage rails 211 that only powers these components. As such, the reference voltage modulator 226 can modulate these voltage rails 211 for capacitive sensing without have to ensure that modulating the voltage rails 211 does not have a negative impact on other components in the input device 200—e.g., where level translation or isolation at communication interfaces is important.

The components in the processing system 110 may be arranged in many different configurations on one or more integrated circuits (chips). In one embodiment, the sensor module 222, display module 224, and reference voltage modulator 226 may be disposed on the same integrated circuit. In one embodiment, the sensor module 222 may be disposed on a different integrated circuit than the reference voltage modulator 226. In another embodiment, the sensor module 222, display module 224, and the reference voltage modulator 226 may be disposed on three separate integrated circuits. In another embodiment, the sensor module 222 and the reference voltage modulator 226 are disposed on the same integrated circuit while the display module 224 is disposed on a separate integrated circuit. Furthermore, in one embodiment, the display module is disposed on one integrated circuit while the sensor module 222 and at least a portion of the display circuity 236 (e.g., a source driver, mux, or TFT gate driver) are disposed on a second integrated circuit, and the reference voltage modulator 226 is disposed on a third integrated circuit.

In one embodiment, the processing system 110 includes an integrated circuit that includes the power management controller 230, timing controller 220, and high speed link 244 for coupling to the host 204. The integrated circuit may also include sources drivers and receivers for performing display updating and capacitive sensing. Furthermore, this integrated circuit may be disposed on a same substrate that supports the display/sensing panel 234 rather than being located on different substrates. The common substrate may include traces that couple the integrated circuit to the display and sensor electrodes 240, 242.

Moreover, in some displays (e.g., LED or OLED) a backlight may not be needed. The reference voltage rail modulation techniques discussed above may nonetheless be used to perform capacitive sensing.

Figure 3:
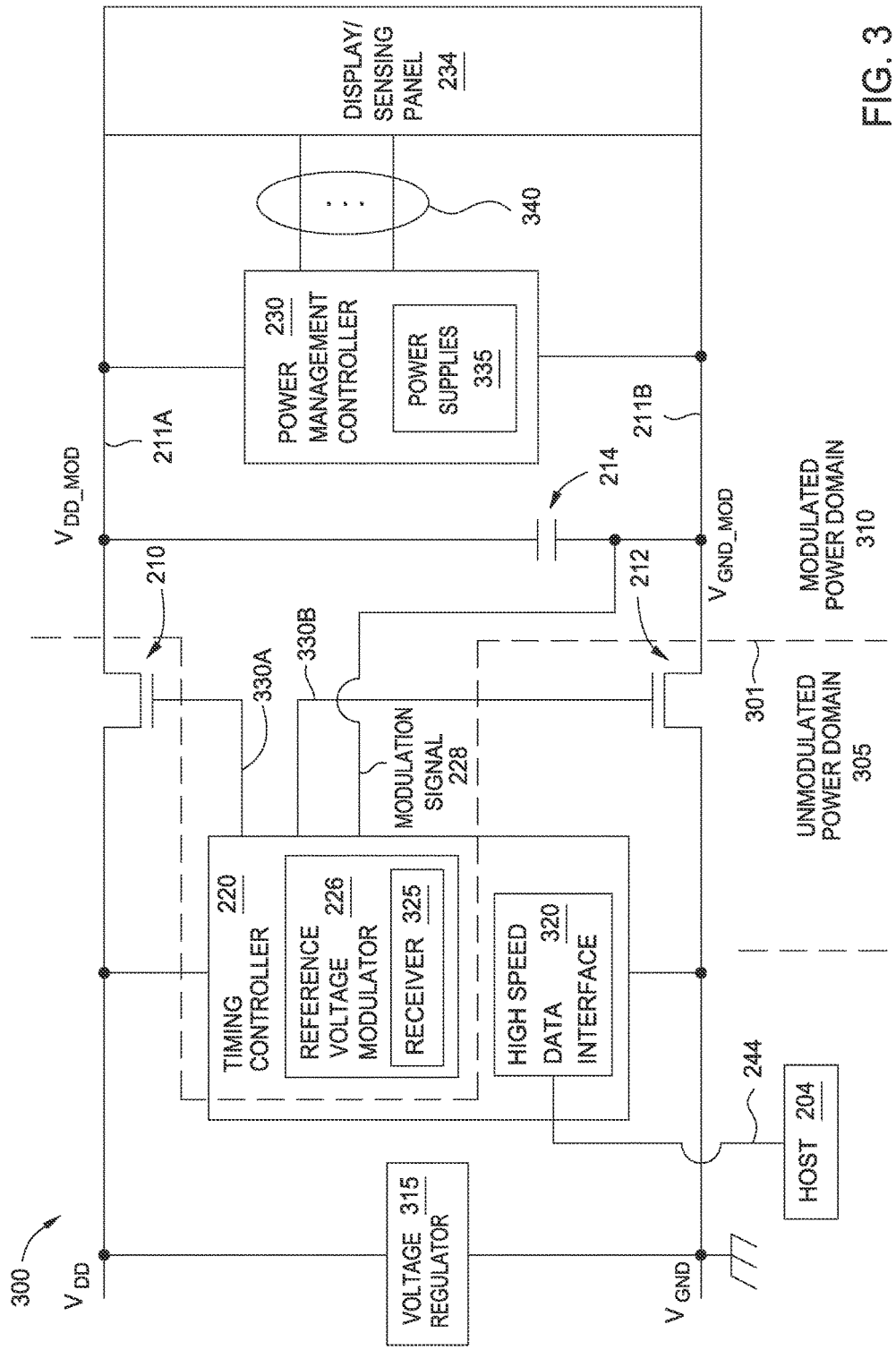
FIG. 3 is an input device that modulates reference voltage rails for performing capacitive sensing, according to one embodiment described herein.

FIG. 3 is an input device 300 that modulates reference voltage rails for performing capacitive sensing, according to one embodiment described herein. The input device 300 includes a voltage regulator 315 for controlling and maintaining the rail voltages $V_{DD}$ and $V_{GND}$ provided by the power supply (not shown). In one embodiment, the voltage regulator 315 may be replaced by a battery and/or the power controller 230 may isolate a modulated power domain 310 from an unmodulated power domain 305. Like in input device 200, device 300 includes the timing controller 220 which outputs control signals 330A, 330B for controlling switches 210, 212 (i.e., transistors). As above, before modulating the reference voltage rails 211 ($V_{DD\_MOD}$ and $V_{GND\_MOD}$), the timing controller 220 opens the switches 210, 212 to electrically disconnect the reference voltage rails 211 from the reference voltages $V_{DD}$ and $V_{GND}$.

When the reference voltage rails 211 are electrically isolated from the reference voltages $V_{DD}$ and $V_{GND}$, the input device 300 has two separate power domains—i.e., an unmodulated power domain 305 and a modulated power domain 310. The unmodulated power domain 305 includes the components to the left of the dotted line 301, while the modulated power domain 310 includes the components to the right of the dotted line 301. The components in the unmodulated power domain 305 operate using the unmodulated, DC reference voltages $V_{DD}$ and $V_{GND}$, while the components in the modulated power domain 310 operate using the modulated reference voltages $V_{DD\_MOD}$ and $V_{GND\_MOD}$ on the reference voltage rails 211. As above, the reference voltage rails 211 are modulated by the modulation signal 228 generated by the reference voltage modulator 226. For example, the modulation signal 228 may be driven to a voltage small than $V_{DD}/2$ which may be an input voltage for the receiver 325. In one embodiment, the reference voltage modulator may be located in the power management controller 230 or a source driver instead of on the timing controller 220 as shown.

As shown, the timing controller 220 includes a high-speed data interface 320 (e.g., an eDP or MIPI standard interface) which is in the unmodulated power domain 305. As such, at least one of the modules in the timing controller 220 is in the unmodulated power domain 305 while at least one of the modules is in the modulated power domain 310. Although not shown, the sensor module and display module may also be in the modulated power domain 310. Furthermore, although the reference voltage modulator 226 is shown as being in the modulated power domain 310, it may also be considered as being in the unmodulated power domain 305 since the modulator 226 may generate the modulation signal 228 relative to chassis ground which is in the unmodulated power domain 305. The communication module may further provide modulation signals 228 and power domain isolation controls 330.

By leaving the high-speed data interface 320 in the unmodulated power domain 305, the timing controller 220 can directly communicate to the host 204. That is, because the data interface 320 and the host 204 are both in the unmodulated power domain 305, they may be able to transmit data signals directly. In contrast, if the interface 320 were in the modulated power domain 310 and was using the modulated reference voltages to operate, the interface 320 may be unable to detect and identify the data signals received from the host 204 without substantially increasing in cost, power, and design time. Although not shown, the timing controller 220 may include level shifters from permitting the high-speed data interface 320 to communicate with other modules in the timing controller 220. For example, when receiving update display data from the host 204, the high-speed data interface 320 may use the level shifters when transmitting the display data to the display module within the modulated power domain 310.

In another embodiment, the whole timing controller 220 may be in the modulated power domain 310. To communicate with the host 204, a separate communication module may be communicatively coupled between the host 204 and the controller 220. For example, the communication module may be located on a separate integrated circuit than the timing controller 220. The communication module may include one or more level shifters that transmit data signals to the timing controller 220 in the modulated power domain 310 and permit data signals received from the timing controller 220 to be transmitted to the host 204 in the unmodulated power domain 305.

The reference voltage modulator 226 includes a receiver 325 which acquires the resulting signals from the display and sensor electrodes in the panel 234 when modulating the reference voltage rails 211. The receiver 325 may use the same electrical connection used by the modulation signal 228 to modulate the rails 211 to also acquire the resulting signals. That is, the reference voltage modulator 226 may use the same port to both transmit the modulation signal 228 and acquire the resulting signals from the display and sensor electrodes in the in display/sensing panel 234. Alternatively, reference voltage modulator 226 may use the display/sensing panel 234 only to receive the signals while the modulation signal 228 is supplied to the reference electrode by another component (e.g., a source driver or the power management controller 230).

In input device 300, the power management controller 230 includes multiple power supplies 335 which output multiple different DC voltages to the panel 234 via the links 340. To generate the various voltages, the power supplies 335 may be switched power supplies that use inductive boost circuits or capacitive charge pumps to change the voltages provided by the reference voltage rails 211 (i.e., $V_{DD\_MOD}$ and $V_{GND\_MOD}$) to voltages required by the components in the panel 234—e.g., $V_{GH}$, $V_{GL}$, VCOM, etc. In one embodiment, when the reference voltage modulator 226 modulates the reference voltage rails 211, the power management controller 230 may deactivate the power supplies 335 (e.g., the input device is in a low-power state). However, when the input device 300 performs display updating or capacitive sensing when the voltage rails 211 are not being modulated, the power supplies 335 may be active to provide DC power to the panel 234.

Figure 4:
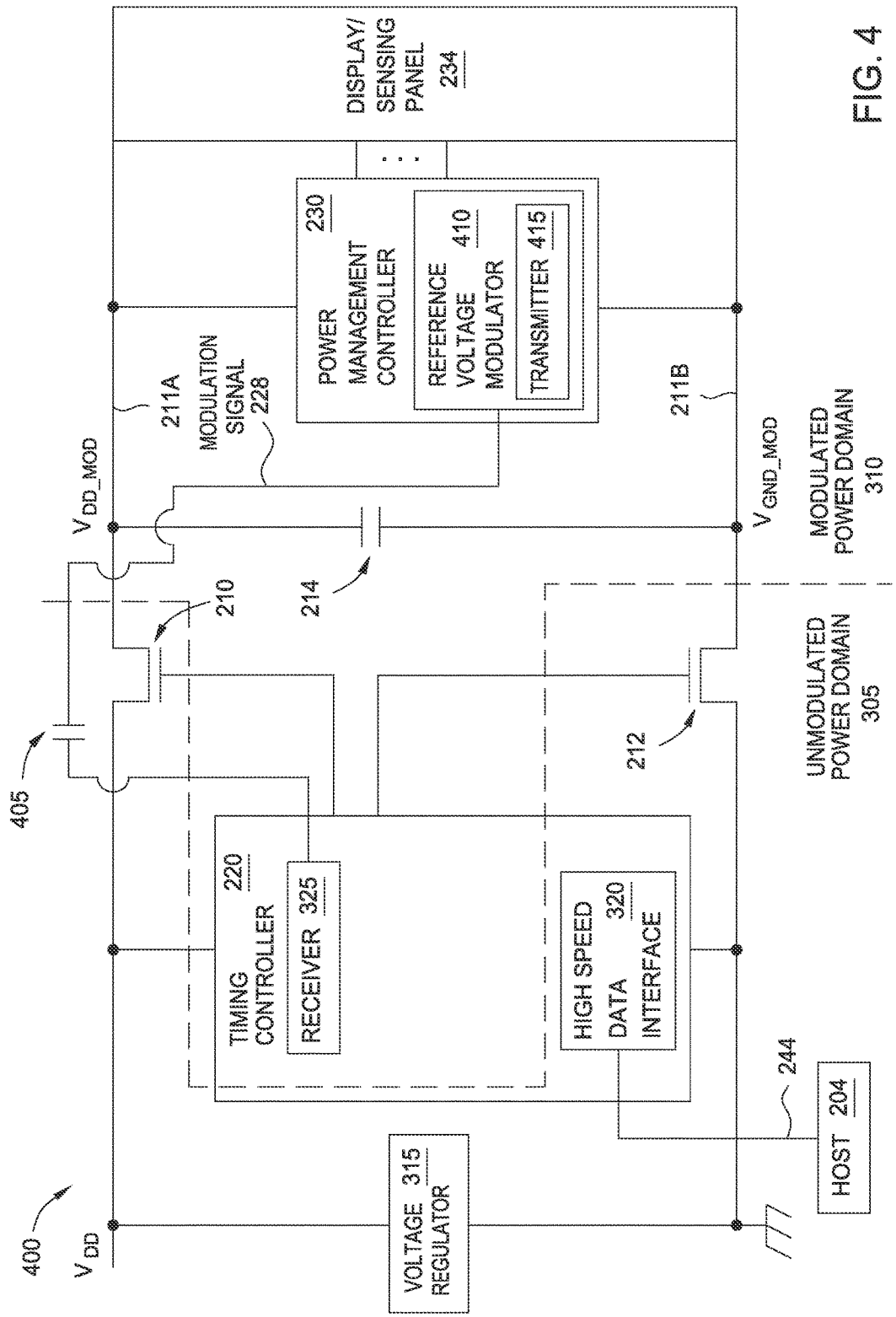
FIG. 4 is an input device that modulates reference voltage rails for performing capacitive sensing, according to one embodiment described herein.

FIG. 4 is an input device 400 that modulates reference voltage rails for performing capacitive sensing, according to one embodiment described herein. In contrast to input device 300 in FIG. 3, input device 400 includes a reference voltage modulator 410 that does not acquire the resulting signals when modulating at least one of the voltage rails 211. As shown, the reference voltage modulator 410 includes a transmitter 415 for generating the modulation signal 228 and is disposed in the power management controller 230. However, the receiver 325 is not located in the modulator 410. Instead the receiver 325 is located outside the modulator 410 in the timing controller 220 (but could also be located elsewhere in the processing system 110 such as on a separate integrated circuit). Thus, in this embodiment, the electrical path used acquire the resulting signals is different than the electrical path used to drive the modulation signal 228. Further, as shown here, a direct ohmic connection between receiver 325 and the modulated rail 211 is not required where capacitive signals are provided by, e.g., capacitor 405. Thus, FIGS. 3 and 4 illustrate that the resulting signals can be acquired via either one of the voltage rails 211. In one embodiment, the receiver 325 is in the lowest impedance path for the modulation signal 228 to couple to the electrodes in the display/sensing panel 234. In one embodiment, the transmitter 415 also drives the modulation signal 228 onto the reference voltage rails 211 using the power management controller's connection to the reference voltage rails 211.

As shown, a capacitor 405 is located in the electrical path coupling the receiver 325 to the voltage rail 211A, although the capacitor 405 is optional. The receiver 325 may measure the charge accumulated (or the voltage) on the capacitor 405 when the transmitter 415 modulates the reference voltage rails 211 in order to determine when an input object is proximate to the display/sensing panel 234.

Figure 5:
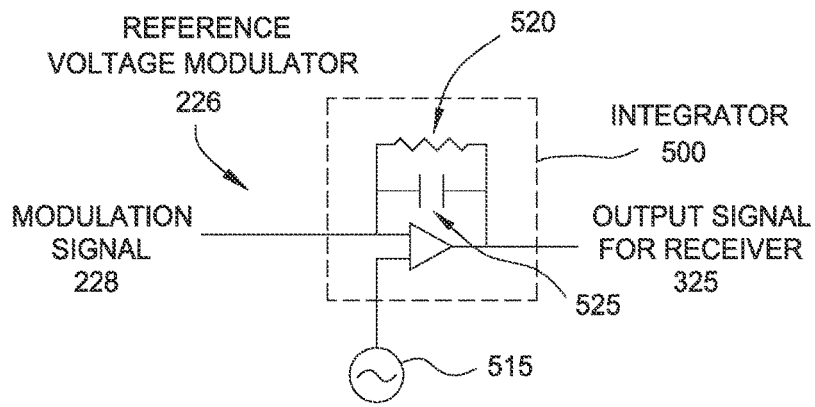
FIG. 5 is a circuit diagram of a reference voltage modulator, according to one embodiment described herein.

FIG. 5 is a circuit diagram of the reference voltage modulator 226 shown in FIG. 3, according to one embodiment described herein. The modulator 226 includes an integrator 500 which outputs the modulation signal 228. Moreover, because the integrator 500 serves as a receiver, the modulator also acquires the resulting signals from the display and sensor electrodes at the output of the integrator 500. One input of an amplifier in the integrator 500 is coupled to a signal generator 515 which outputs a modulated signal that the integrator 500 then uses to drive the modulation signal 228 through feedback from the sensor output. For example, the integration function may be performed by a capacitor 525, for example, in a low pass filter such that offset drift is compensated—e.g., by a reset switch or an optional resistor 520.

Describing the function of the reference voltage modulator 226 generally, the integrator 500 measures the amount of charge (using the resulting signals) that the amplifier has to provide through capacitor 525 in order to modulate the display and sensor electrodes in the display panel by modulating reference voltage rails. Although not shown, the receiver 325 may be coupled to a filter and a sampling circuit—e.g., an ADC—for processing the resulting signals. Moreover, FIG. 5 illustrates only one example of a suitable structure for a reference voltage modulator 226 and receiver. Stated generally, the modulator 226 can be any type of transmitter circuitry that drives a modulation signal 228 and any type of analog circuitry for receiving a measurement of capacitance or a change in capacitance in a circuit. Alternatively, as shown in FIG. 4, the receiver 325 may be separate from the reference voltage modulator. For example, the reference voltage modulator may include only a modulator that drives the modulation signal 228, while the receiver may be located elsewhere in the processing system (e.g., a separate integrated circuit, in the power management controller, etc.).

Figure 6:
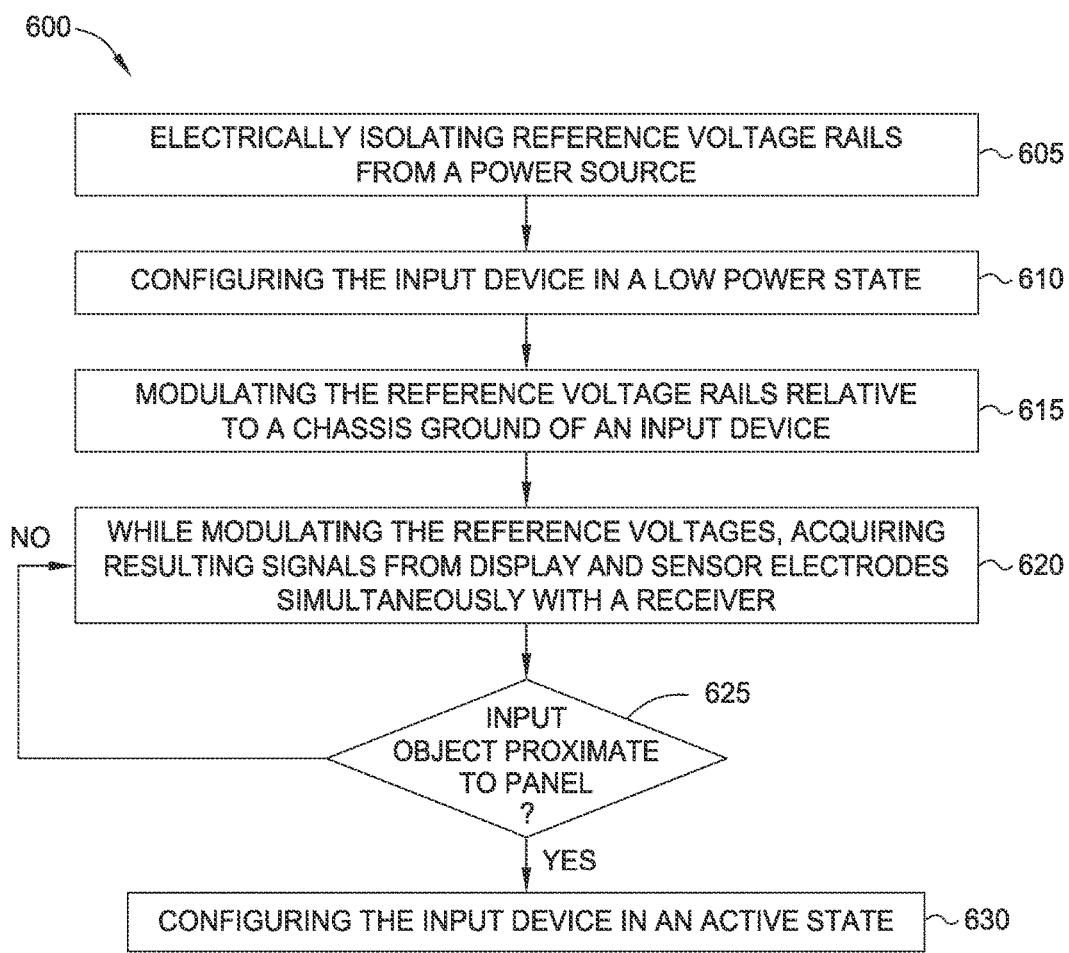
FIG. 6 is a flow diagram for waking up an input device from a low power state using modulated reference voltage rails, according to one embodiment described herein.

FIG. 6 is a flow diagram illustrating a method 600 for waking up an input device from a low power state using modulated reference voltage rails, according to one embodiment described herein. At block 605, the timing controller electrically isolates the reference voltage rails from a power source either by selectively disconnecting the rails or using an indirect coupling method such as inductively coupling. For example, the power source may be a battery that provides DC voltage outputs (e.g., $V_{DD}$ and $V_{END}$) to power the various components in the input device. Because the function of some components may be negatively affected by modulating the outputs of the power source, the timing controller electrically isolates the reference voltage rails from the battery. Alternatively, when updating a display of the input device or performing capacitive sensing that does not modulate the reference voltage rails, the timing controller may permit the reference voltage rails to be electrically connected to the power source. During these time periods, the power source may directly drive unmodulated, DC voltages onto the voltage rails. In some embodiments, the power may be provided consistently (e.g., the voltage rails are inductively coupled to the power supplies) even while the voltage rails are modulated, floated, or held at a relatively constant voltage relative to chassis ground.

At block 610, the input device configures the input device in a low-power state. In one embodiment, the input device may determine to enter the low-power state after identifying a period of inactivity where the user has failed to interact with the input device. For example, if the user does not use a function of the input device within a predefined time period (e.g., touch the sensing region, place a phone call, hit a button, etc.), the input device may switch to the low-power state. In another example, the user may instruct the input device to enter in the low-power state by making a predefined gesture in the sensing region or activating a particular button.

In the low-power state, the input device deactivates one or more components in the input device to conserve power (e.g., power supplies, PMICs, backlight, etc.). As shown in FIG. 2, because the reference voltage modulator 226 acquires the resulting signals for performing capacitive sensing, the sensor module 222 and corresponding capacitive sensing circuitry (if any) in the display/sensing panel 234 may be deactivated. Similarly, if the low-power state does not need to display an image, the display module 224 and display circuitry 236 can be deactivated. Furthermore, the input device can effectively deactivate the components in the display/sensing panel 234 by deactivate the power management controller 230 which stops providing power to the panel 234. Further, deactivating the power management controller 230 may turn off the backlight 232. In one embodiment, the low-power state means that at least the sensor module 222, display module 224, power management controller 230, and all the powered components in the display/sensing panel 234 are deactivated. However, in other embodiments, some of these components may remain powered in the low-power state.

At block 615, a reference voltage modulator modulates reference voltage rails relative to the chassis ground of the input device. At block 620, while modulating the voltage rails, a receiver acquires resulting signals from display and sensor electrodes in the panel simultaneously. To do so, the receiver may be coupled to the display and sensor electrodes in the panel at a common electrical node—e.g., a supply voltage. Using the resulting signals, the receiver (or other component in the input device) determines a capacitance or change in capacitance corresponding to the display and sensor electrodes. By comparing this capacitance measurement to one or more thresholds, the input device can detect when an input object is proximate to the panel.

Although the receiver may be integrated into the reference voltage modulator which generates the signal for modulating the reference voltage rails, the receiver may be located anywhere on the processing system that permits it to couple to the display and/or sensor electrodes in the panel. For example, the receiver may be located at a different location in a timing controller than the reference voltage modulator or on a separate integrated circuit altogether. Furthermore, the receiver may be located on the power management controller. In one embodiment, regardless of its location, the receiver is coupled to one (or both) of the reference voltage rails being modulated.

At block 625, the input device determines if an input object is proximate to the display/sensing panel by evaluating the resulting signals acquired at block 620. If an input object is not proximate to the input device (e.g., not contacting the panel or hovering over the panel), method 600 proceeds to 620 where the receiver again acquires the resulting signals while the voltage rails are modulated. For example, when in the low-power state the input device may, at intervals, modulate the reference voltage rails and acquire the resulting signal until an input object is detected. The duty cycle of these low power cycle may be low—e.g., greater than 10 ms—but fast enough to track environmental changes—e.g., faster than 100 seconds.

If an input object is detected at block 625, method 600 proceeds to block 630 where the input device switches to an active state. In one embodiment, when switching from the low-power state to the active state, at least one component that was deactivated or powered down in the low-power state is activated. For example, the input device may activate the sensor module and capacitive sensing circuitry on the panel to perform capacitive sensing to determine a specific location of the input object in the panel. Alternatively or additionally, the input device may activate the display module and display circuitry (and the backlight) so that an image is displayed. In some low power modes, modulation of the reference voltage is not required where interference is being detected or detecting the presence of an active pen. For example, the duty cycle when performing interference or active pen detection, the duty cycles may be slow (e.g., less than 100 ms).

In one embodiment, when in the activate state, some of the components in the input device may still be deactivated. For example, at block 630, the input device may activate only the components necessary to perform capacitive sensing to determine the location of the input object in the panel. The display components (e.g., the backlight or display module) may still be deactivated. For instance, when in the active state the input device may use the sensor module to ensure that the input object detected at block 625 was not a false positive before activating the display components. In another example, the reference voltage modulator can detect when input object approaches (e.g., hovers over) the display which then causes the input device to switch to the active state at block 630. However, before activating the display components, the input device may use the sensor module to determine if the user made a predefined wake-up gesture using the input object. Thus, although not shown in method 600, the active state may be an intermediary power state that draws more power than the low-power state but draws less power than a fully active state where, for example, both display updating and capacitive sensing are performed.

Figure 7:
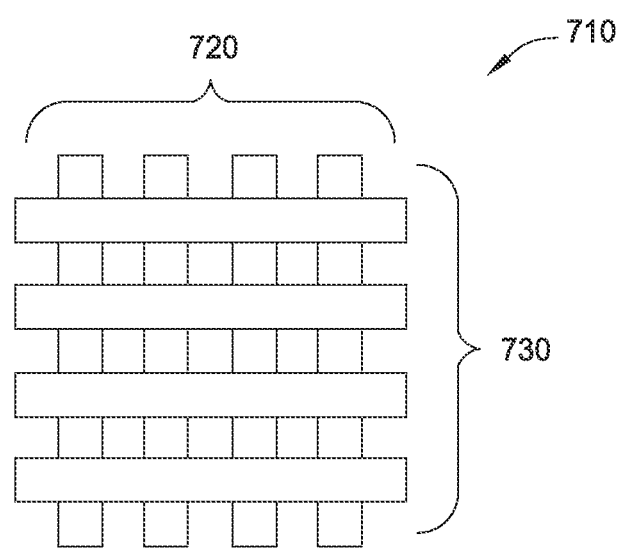
FIG. 7 illustrate an exemplary electrode arrangement for performing capacitive sensing, according to one embodiment described herein.

FIG. 7 illustrate an exemplary electrode arrangement for performing capacitive sensing, according to one embodiment described herein. FIG. 7 shows a portion of an example sensor electrode pattern comprising sensor electrodes 710 configured to sense in a sensing region associated with the pattern, according to some embodiments. For clarity of illustration and description, FIG. 7 shows a pattern of simple rectangles, and does not show various components. Further, as illustrated the sensor electrodes 710 comprise a first plurality of sensor electrodes 720, and a second plurality of sensor electrodes 730.

In one embodiment, the sensor electrodes 710 may be arranged on different sides of the same substrate. For example, each of the first and second plurality of sensor electrode(s) 720, 730 may be disposed on one of the surfaces of the substrate. In other embodiments, the sensor electrodes 710 may be arranged on different substrates. For example, each of the each of the first and second plurality of sensor electrode(s) 720, 730 may be disposed on surfaces of separate substrates which may be adhered together. In another embodiment, the sensor electrodes 710 are all located on the same side or surface of a common substrate. In one example, a first plurality of the sensor electrodes comprise jumpers in regions where the first plurality of sensor electrodes crossover the second plurality of sensor electrodes, where the jumpers are insulated from the second plurality of sensor electrodes.

The first plurality of sensor electrodes 720 may extend in a first direction, and the second plurality of sensor electrodes 730 may extend in a second direction. The second direction may be similar to or different from the first direction. For example, the second direction may be parallel with, perpendicular to, or diagonal to the first direction. Further, the sensor electrodes 710 may each have the same size or shape or differing size and shapes. In one embodiment, the first plurality of sensor electrodes may be larger (larger surface area) than the second plurality of sensor electrodes. In other embodiments, the first plurality and second plurality of sensor electrodes may have a similar size and/or shape. Thus, the size and/or shape of the one or more of the sensor electrodes 710 may be different than the size and/or shape of another one or more of the sensor electrodes 710. Nonetheless, each of the sensor electrodes 710 may be formed into any desired shape on their respective substrates.

In other embodiments, one or more of sensor electrodes 710 are disposed on the same side or surface of the common substrate and are isolated from each other in the sensing region. The sensor electrodes 720 may be disposed in a matrix array where each sensor electrode may be referred to as a matrix sensor electrode. Each sensor electrode of sensor electrodes 710 in the matrix array may be substantially similar size and/or shape. In one embodiment, one or more of sensor electrodes of the matrix array of sensor electrodes 710 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled a separate capacitive routing trace of a plurality of capacitive routing traces. In various embodiments, the sensor electrodes 710 comprises one or more gird electrodes disposed between at least two sensor electrodes of sensor electrodes 710. The grid electrode and at least one sensor electrode may be disposed on a common side of a substrate, different sides of a common substrate and/or on different substrates. In one or more embodiments, the sensor electrodes 710 the grid electrode(s) may encompass an entire voltage electrode of a display device. Although the sensor electrodes 710 may be electrically isolated on the substrate, the electrodes may be coupled together outside of the sensing region—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

Processing system 110 shown in FIG. 1 may be configured to drive one or more sensor electrode of the sensor electrodes 710 with modulated signals (i.e., absolute capacitive sensing signals) to determine changes in absolute capacitance of the sensor electrodes 710. In some embodiments, processing system 110 is configured to drive a transmitter signal onto a first one of the sensor electrodes 710 and receive a resulting signal with a second one of the sensor electrodes 710. The transmitter signal(s) and absolute capacitive sensing signal(s) may be similar in at least one of shape, amplitude, frequency and phase. Processing system 110 may be configured to drive a grid electrode with a shield signal to operate the grid electrode as a shield and/or guard electrode. Further, processing system 110 may be configured to drive the grid electrode with a transmitter signal such that the capacitive coupling between the grid electrode and one or more sensor electrodes may be determined, or with an absolute capacitive sensing signal such that the absolute capacitance of the grid electrode may be determined.

As used herein, a shield signal refers to a signal having one of a constant voltage or a varying voltage signal (guard signal). The guard signal may be substantially similar in at least one of amplitude and phase to a signal modulating a sensor electrode. Further, in various embodiments, the guard signal may have an amplitude that is larger than or less than that of the signal modulating a sensor electrode. In some embodiments, the guard signal may have a phase that is different from the signal modulating the sensor electrode. Electrically floating an electrode can be interpreted as a form of guarding in cases where, by floating, the second electrode receives the desired guarding waveform via capacitive coupling from a nearby driven sensor electrode of the input device 100.

As is discussed above, in any of the sensor electrode arrangements discussed above, the sensor electrodes 710 may be formed on a substrate that is external to or internal to the display device. For example, the sensor electrodes 710 may be disposed on the outer surface of a lens in the input device 100. In other embodiments, the sensor electrodes 710 are disposed between the color filter glass of the display device and the lens of the input device. In other embodiments, at least a portion of the sensor electrodes and/or grid electrode(s) may be disposed such that they are between a Thin Film Transistor substrate (TFT substrate) and the color filter glass of the display device 160. In one embodiment, a first plurality of sensor electrodes are disposed between the TFT substrate and color filter glass of the display device 160 and the second plurality of sensor electrodes are disposed between the color filter glass and the lens of the input device 100. In yet other embodiments, all of sensor electrodes 710 are disposed between the TFT substrate and color filter glass of the display device, where the sensor electrodes may be disposed on the same substrate or on different substrates as described above.

In any of the sensor electrode arrangements described above, the sensor electrodes 710 may be operated by the input device 100 for transcapacitive sensing by dividing the sensor electrodes 710 into transmitter and receiver electrodes or for absolute capacitive sensing, or some mixture of both. Further, one or more of the sensor electrodes 710 or the display electrodes (e.g., source, gate, or reference (Vcom) electrodes) may be used to perform shielding.

The areas of localized capacitive coupling between first plurality of sensor electrodes 720 and second plurality of sensor electrodes 730 form capacitive pixels. The capacitive coupling between the first plurality of sensor electrodes 720 and second plurality of sensor electrodes 730 changes with the proximity and motion of input objects in the sensing region associated with the first plurality of sensor electrodes 720 and second plurality of sensor electrodes 730. Further, the areas of localized capacitance between the first plurality of sensor electrodes 720 and an input object and/or the second plurality of sensor electrodes 730 and an input object may also form capacitive pixels. As such, the absolute capacitance of the first plurality of sensor electrodes 720 and/or the second plurality of sensor electrodes changes with the proximity and motion of an input object in the sensing region associated with the first plurality of sensor electrodes 720 and second plurality of sensor electrodes 730.

In some embodiments, the sensor pattern is "scanned" to determine these capacitive couplings. That is, in one embodiment, the first plurality of sensor electrodes 720 are driven by, for example, sensor module 222 in FIG. 2 to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of second plurality of sensor The receiver sensor electrodes may be operated singly or multiply to acquire resulting signals. The resulting signals may be used to determine measurements of the capacitive couplings at the capacitive pixels. The receive electrodes may also be scaled (e.g., by a multiplexer) to a reduced number of capacitive measurement inputs for receiving the signals.

In other embodiments, scanning the sensor pattern comprises driving one or more sensor electrode of the first and/or second plurality of sensor electrodes of with absolute sensing signals while receiving resulting signals with the one or more sensor electrodes. The sensor electrodes may be driven and received with such that one second electrode is driven and received with at one time, or multiple sensor electrodes driven and received with at the same time. The resulting signals may be used to determine measurements of the capacitive couplings at the capacitive pixels or along each sensor electrode.

A set of measurements from the capacitive pixels form a "capacitive frame". The capacitive frame may comprise a "capacitive image" representative of the capacitive couplings at the pixels and/or or a "capacitive profile" representative of the capacitive couplings or along each sensor electrode. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

The background capacitance of a sensor device is the capacitive frame associated with no input object in the sensing region. The background capacitance changes with the environment and operating conditions, and may be estimated in various ways. For example, some embodiments take "baseline frames" when no input object is determined to be in the sensing region, and use those baseline frames as estimates of their background capacitances.

Capacitive frames can be adjusted for the background capacitance of the sensor device for more efficient processing. Some embodiments accomplish this by "baselining" measurements of the capacitive couplings at the capacitive pixels to produce a "baselined capacitive frames." That is, some embodiments compare the measurements forming a capacitance frames with appropriate "baseline values" of a "baseline frames", and determine changes from that baseline image. These baseline images may also be used in the low power modes discussed above for profile sensing or actively modulated active pens.

Interference and Active Pen Detection

Figure 8:
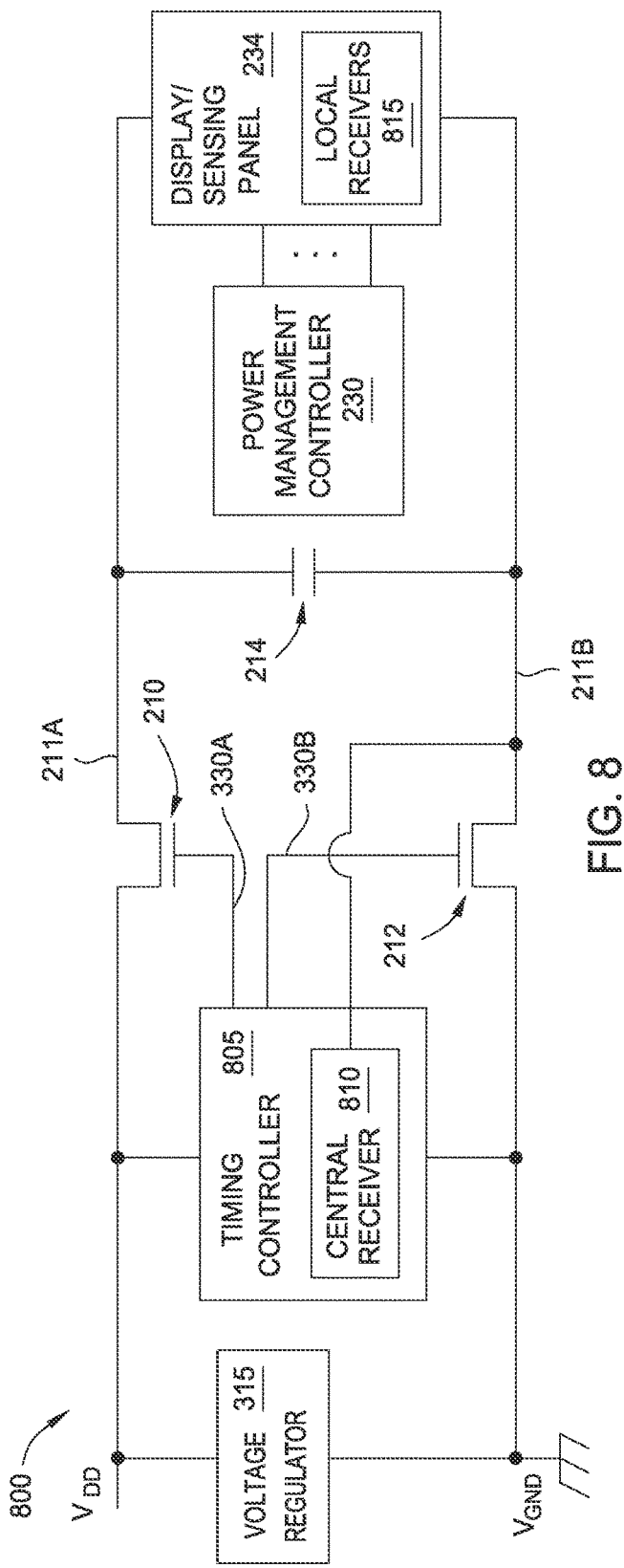
FIG. 8 is an input device that detects a noise signal or a communication signal from an active input object, according to one embodiment described herein.

FIG. 8 is an input device 800 that detects a noise (i.e., interference) signal or a communication signal from an active input object, according to one embodiment described herein. Input device 800 has a similar structure as input device 300 in FIG. 3, and indeed, an individual input device may be able to perform the reference voltage modulation discussed in FIG. 3 as well as the interference and active input object detection. However, in other embodiments, an input device may be configured to perform only one of these functions. In one embodiment, the active object is actively modulated relative to chassis ground with a known or configurable frequency, duty cycle, timed encoding, etc.

The timing controller 805 in input device 800 includes a central receiver 810 coupled to the low reference voltage rail 211B. Like the receiver 325 in FIG. 3, central receiver 810 is coupled with the display and sensor electrodes in the display/sensing panel 234 via the power supplies in the power management controller 230. In one embodiment, the central receiver 810 may be directly coupled to some components in the display/sensing panel 234 since the voltage rails 211 may also directly couple to the panel 234, but is indirectly coupled to other components in the panel 234 via the power supplies in the controller 230. In either case, all the electrodes (and possibly other components in the panel 234) are coupled to a common electrical node with the central receiver 810, and thus, the panel 234 can function as a single capacitive pixel.

However, the central receiver 810 does not need to be coupled to all of the display and sensor electrodes in the panel 234 but instead could be coupled to only the display electrodes or only the sensor electrodes. However, by limiting the number of electrodes coupled with the central receiver 810 (e.g., to a single source driver), the size of a sensing region in the panel 234 (or a sensitivity of the capacitive pixel) may be decreased so that a fraction of the panel is measured even if electrodes across the panel are scanned.

Unlike the embodiment shown in FIG. 3, to detect interference or a communication signal from an active input object (e.g., a stylus or pen which has a wireless transmitter), the input device 800 does not modulate the reference voltage rails 211. Instead, the rails 211 may remain unmodulated, DC voltages relative to chassis ground. However, like in FIG. 3, the timing controller 805 may electrically disconnect the voltage rails 211 from the power source voltages $V_{DD}$ and $V_{GND}$ before detecting interference or a communication signal. Using signals 330A, 330B, the timing controller 805 opens the switches 210, 212 thereby disconnecting the voltage rails 211 from the power source voltages. Alternatively, the reference voltage rails 211 may be inductively coupled to the power source voltages in which case the rails 211 are always isolated from these voltages.

If a noise source or an active input object is proximate to the electrodes on the panel 234, the interference signal generated by the noise source or the digital communication signal generated by the input object generate resulting signals on the display and sensor electrodes in the panel 234 which are then acquired by the central receiver 810. By processing the resulting signals, the input device 800 can identify the interference signal and compensate for it. Some non-limiting examples of actions the input device 800 may take to compensate for interference signals include switching to a different sensing frequency, limiting the number of input objects being report, cease using some features such as proximity detection or glove detection, increasing the number of frames that are averaged before detecting a touch location, ignoring any new input objects that are detected when interference occurs, preventing a sensor module from reporting that an input object has left the sensing region, or changing the capacitive frame rate.

If the resulting signals are caused by an active input object, the input device 800 can decode the digital signal and perform a corresponding action. If the active input object transmits the communication signal using a wireless transmitter, the display and sensor electrodes on the panel 234 serve as antennas for receiving the signal. Thus, neither the noise source nor the active input object needs to be contacting the panel 234 in order to generate the resulting signals on the electrodes in the panel 234—e.g., the input object may be hovering over the panel 234.

Moreover, the display/sensing panel 234 includes multiple local receivers 815 which each may be coupled to a respective sensor electrode in the panel 234. When performing capacitive sensing, the local receivers 815 measure resulting signals from the respective sensor electrodes which can be used to identify a particular location in the panel 234 an input object is contacting or hovering over. In one embodiment, the local receivers 815 may perform a similar function as receiver 810—i.e., both receivers 810, 815 measure capacitance. In one embodiment, instead of using central receiver 810 to detect an interference signal or a communication signal from an active input object, an input device could combine all the resulting signals received by the local receivers 815 on the panel 234. However, detecting interference signals and communication signals may require more power, or circuitry that is more complex or expensive than circuitry required only to perform capacitive sensing using receiver 810. As such, if the local receivers 815 were used to detect the interference or communication signals, they may be more expensive than local receivers 815 used to only perform capacitive sensing using a modulated signal. Thus, instead of having multiple receivers 815 that are expensive, input device 800 may use only one central receiver 810 which can be used to detect the interference and communication signals. Central receiver 810 may have a greater dynamic range, a faster ADC, and/or be more noise tolerant than the local receivers 815 which results in the local receivers 815 being cheaper to manufacture than central receiver 810. Thus, in one embodiment, instead of having tens or hundreds or expensive local receivers 815 capable of identifying interference and communication signals from an active input object, the input device 800 has only one—i.e., central receiver 810. Because local receivers 815 may not be used to detect interference or the communication signals, they can be cheaper than would otherwise be possible.

In one embodiment, the interference or communication signals can be measured while the display is updated. That is, the timing controller may include a display module that is actively updating pixels in the display/sensing panel 234 while the central receiver 810 is acquiring signals as described above. Even though the power management controller 230 and panel 234 are selectively disconnected (or isolated) from the power source voltages $V_{DD}$ and $V_{END}$, the charge stored in the bypass capacitor 214 can be used to power the voltage rails 211 and permit display updating to occur. When the charge across the capacitor 214 drops to a threshold, the timing controller 805 may reconnect the voltage rails 211 and the capacitor to the power source voltages $V_{DD}$ and $V_{GND}$ or otherwise coupled (e.g., inductively couple) the power source voltages to the rails 211. Moreover, the central receiver 810 may cease measuring the interference or communication signals when the voltage rails 211 are ohmically coupled to the power source voltages $V_{DD}$ and $V_{GND}$. However, the capacitor 214 (e.g., 15-150 microfarads) may store enough charge to power the power management controller 230 and panel 234 for enough time to permit the central receiver 810 to identify an interference signal generated by a noise or a communication signal provided by an active pen or stylus.

Figure 9:
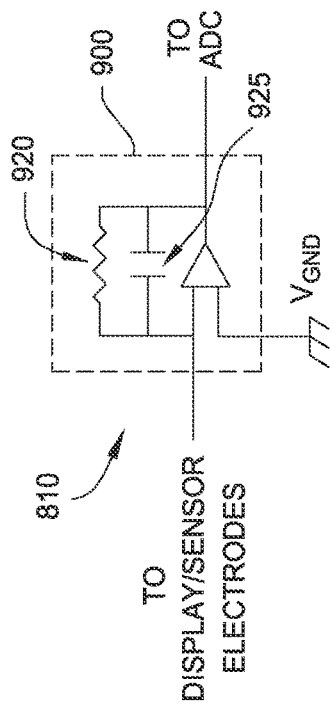
FIG. 9 is circuit diagram of a receiver for acquiring resulting signals to identify the noise or communication signal, according to one embodiment described herein.

FIG. 9 is circuit diagram of the central receiver 810 for acquiring resulting signals to identify the noise or communication signal, according to one embodiment described herein. The central receiver 810 includes an integrator 900 for acquiring the resulting signals from the display and sensor electrodes similar to integrator 500. The integrator 900 may be implemented as a low pass filter with a feedback capacitor 915 and optional resistor 920 when the feedback signal is measured and controls a reference voltage on one of the rail 211. As shown, one input of an amplifier in the integrator 900 is coupled to $V_{GND}$ (e.g., chassis ground or $V_{DD}/2$). In one embodiment, the central receiver 810 is the lowest impedance path between the noise source or active pen and chassis ground. As such, the resulting signals caused by the interference signals generated by the noise source or the communication signal generated by the input object flow through the central receiver 810, and thus, are measured by the central receiver 810 rather than flowing through another component in the input device. Stated differently, by selectively disconnecting or isolating the voltage rails from the power source, the central receiver 810 becomes the lowest impedance path between the noise source and active input object and chassis ground, and as such, the resulting signals generated by the noise source and active input object primarily flow through the central receiver 810 and integrator 900 where the signals can be measured.

Integrator 900, however, is only one type of circuit suitable for performing the function of the central receiver 810. Stated generally, the central receiver 810 can be any analog circuit that measures capacitance. For example, the central receiver 810 can include circuitry that measures accumulated charge or the voltage across capacitor 925, or circuitry that measures capacitance using current flowing through the central receiver 810.

Figure 10:
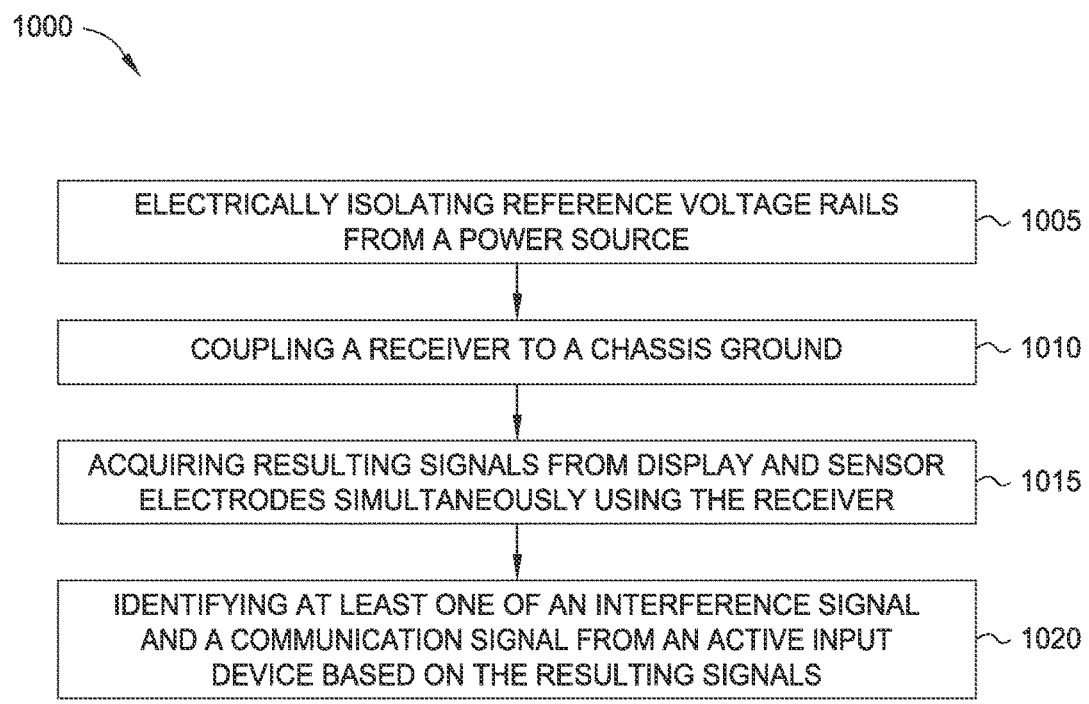
FIG. 10 is a flow diagram for identifying the noise or communication signal using capacitive sensing, according to one embodiment described herein.

FIG. 10 is a flow diagram illustrating a method 1000 for identifying the noise or communication signal using capacitive sensing, according to one embodiment described herein. At block 1005, the input device isolates a reference voltage rail from a power source. For example, switches may selectively disconnect the reference voltage rails from the power source or the rails may be permanently isolated from the power source by inductive coupling. In one embodiment, a capacitor (e.g., bypass capacitor 214 shown in FIG. 8) may be connected between the rails to provide temporary power for the components in the input device powered by the reference voltage rails which may be disconnected when the capacitive sensing signals are received. For example, display updating and capacitive sensing may be performed while the voltage rails are isolated from the power supply.

At block 1010, a central receiver is coupled to chassis ground (through its power supplies) and to one or more display and/or sensor electrodes in the display/sensing panel. Moreover, the central receiver may provide a low impedance path between the electrodes and ground. Thus, when a noise source becomes capacitively coupled to the electrodes in the panel or a communication signal from an active input device is received on the electrodes, a current loop is formed that flows through the central receiver.

At block 1015, the central receiver acquires resulting signals from the display and sensor electrodes simultaneously. For example, the display electrodes, sensor electrodes, and the central receiver may be coupled to a common electrical node such that the combination of the resulting signals generated on the display and sensor electrodes flow through the receiver to reach chassis ground.

In one embodiment, the central receiver may acquire the resulting signals when in the low-power state recited above in FIG. 6 when the display and sensor modules are deactivated. During a first time period, the input device may acquire resulting signals while the reference voltage rails are not modulated in order to identify an interference signal or communication signal. During a second time period, the input device may acquire resulting signals while the reference voltage rails are modulated as discussed in FIG. 6. Moreover, if an interference signal is detected during the first time period, the input device may change the modulated signal used to modulate the voltage rails during the second time period to avoid harmful interference from a noise source. However, as mentioned above, method 1000 may also be performed by itself or in parallel with display updating when the input device is in an active or high-power state.

At block 1020, the input device identifies at least one of an interference signal and a communication signal from an active input device based on the acquired resulting signals. If an interference signal is identified, the input device may compensate for the signal by, for example, switching to a modulation signal that is outside the range of the interference signal when performing capacitive sensing. If a communication signal is received, the input device may process the signal to determine information about the active input object. For example, the communication signal may identify the current tilt of the input object relative to the display/sensing panel, a particular color or marking to be displayed in a location where the input object contacts the panel, or an ID for the input object or other object (e.g., a Bluetooth connection) attempting to pair with the input device. In another example, the communication signal may indicate to the input device that a button on the input object was pressed by the user which may correspond to a particular function in the input device such as switching to the low-power state, waking up from the low-power state, opening a particular application, changing the appearance of markings made in the display using the input object, and the like.

In one embodiment, if a communication signal is received, the input device may increase a number of detection frames used to detect the input object relative to a number of capacitive frames. Alternatively or additionally, the input device may search for the location of the input object in the sensing region by performing a coarse search (sensing using groups of the sensor electrodes) followed by a more granular search (sensing on each sensor electrode individually using local receivers) once the position of the input object is detected during the coarse search.

Mitigating Effects of Low Ground Mass

Figure 11:
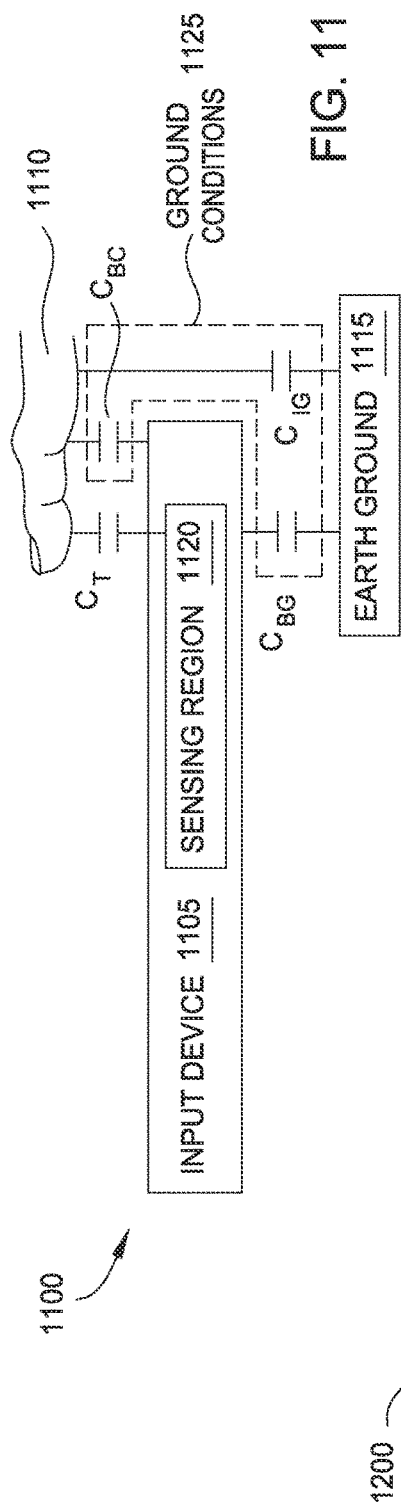
FIG. 11 illustrates various capacitances between an input device and an environment, according to one embodiment described herein.

FIG. 11 illustrates various capacitances between an input device and its environment, according to one embodiment described herein. As shown, system 1100 includes an input device 1105, input object 1110, and earth ground 1115 which are capacitively coupled. The input device 1105 includes a sensing region 1120 on a display/sensing panel discussed above for performing capacitive sensing. In one embodiment, by measuring the change in the capacitance between the sensing region 1120 and the input object 1110 ($C_T$), the input device 1105 can determine whether the input object 1110 is contacting or hovering over the sensing region 1120. In some examples, the input device 1105 may determine a particular location in the sensing region 1120 with which the input object 1110 is interacting.

When performing capacitive sensing, however, the resulting signals measured by the input device 1105 may also be affected by other capacitances in the system 1100 besides $C_T$. For example, the input object 1110 may be capacitively coupled to a chassis of the input device 1105 which is represented by $C_{BC}$. Further, both the input object 1110 and the chassis of the input device 1105 are both typically capacitively coupled to earth ground 1115 as represented by $C_{IG}$ and $C_{BG}$, respectively. The capacitances $C_{BC}$, $C_{BG}$, and $C_{IG}$ are referred to herein as ground conditions 1125. Typically, the input device 1105 is unable to control the capacitances in the ground conditions 1125 which vary as the environment of the device 1105 varies. For example, the capacitance $C_{BC}$ between the input object 1110 and the chassis changes depending on whether the user is holding the input device 1105 or the device 1105 is placed on a table. Moreover, the capacitance $C_{IG}$ between the input object 1110 and earth ground 1115 changes if the user is standing on the earth or in an airplane. The input device 1105 may not have any mechanism to measure the position of the input device 1105 and the input object 1110 in the environment, and thus, may be unable to accurately determine if the capacitances in the ground conditions 1125 will affect the ability of the input device 1105 to measure $C_T$.

Because the capacitance $C_T$ between the sensing region 1120 and the input object 1110 is typically the smallest capacitance shown in FIG. 11, it governs the amount of signal received at the input object 1105 because it is the limiting impedance. However, as the capacitances in ground conditions 1125 decrease as the position of the input device 1105 or input object 1110 in the environment changes, these capacitances may reduce the ability of the input device 1105 to accurately monitor $C_T$. For example, if the combined capacitances in the ground conditions 1125 that is in series with $C_T$ has the same value as $C_T$ (e.g., 1-10 pF), the signal received at the input device attributable to is $C_T$ halved. For example, if the input device 1105 is placed on the user's lap, the capacitance $C_{BG}$ may be around 50 pF, and thus, have little effect on the signals measured by the input device 1105. However, if the input device 1105 is placed on a table in contact with earth ground 1115, the capacitance $C_{BG}$ may be around 5 pF. Because the capacitances $C_T$ and $C_{BG}$ are now approximately the same, the effect on the resulting signals acquired by the input device 1105 attributable to $C_T$ (i.e., the capacitance the input device 1105 is attempting to monitor) is approximately halved. Arrangements where a capacitance in the ground conditions 1125 has a significant effect on the resulting signals measured by the input device 1105 are referred to herein as low ground mass (LGM) conditions.

If a LGM condition exists, the input device 1105 may compare the resulting signals to thresholds used detect a touch or hover event which assume that the capacitances of the ground conditions 1125 are large, in which case the input device 1105 may fail to detect the lower capacitive change of a touch/hover event. In order to accurately detect touch/hover events during a LGM condition, the input device 1105 could adjust the thresholds lower independent of LGM or based on a host controlled mode (e.g., the battery is charging); however, as mentioned above, detecting the arrangements of the input device 1105, input object 1110, and earth ground 115 which result in a LGM condition may be difficult or impossible. Instead, the embodiments herein measure resulting signals at a central receiver that represent the total capacitance of the environment (which includes the capacitances in the ground conditions 1125) by modulating the reference voltage rails as discussed above. This total capacitance is correlated to measurements made by local receivers which are connected to individual sensor electrodes in the sensing region 1120. In one embodiment, the resulting signals acquired by the local receivers are normalized using the resulting signals acquired by the central receiver, and by so doing, cancel out (or mitigate) the effect of the capacitances in the ground conditions 1125 on the local capacitance measurements. In another embodiment, the thresholds are adjusted to account for the LGM estimated based on central receiver measurement combined with local receiver measurements.

Figure 12:
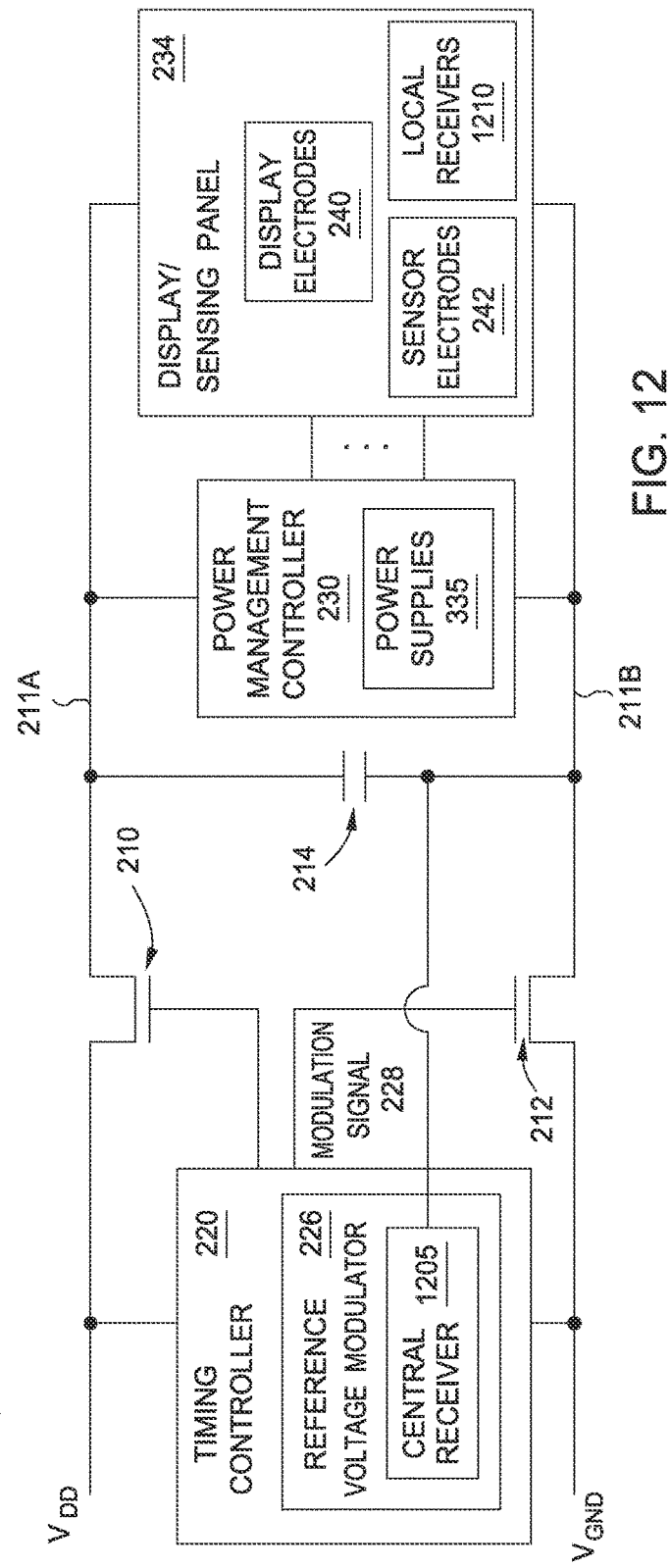
FIG. 12 is an input device that modulates reference voltage rails for performing capacitive sensing, according to one embodiment described herein.

FIG. 12 is an input device 1200 that modulates reference voltage rails for performing capacitive sensing, according to one embodiment described herein. Like the input devices shown in FIGS. 3 and 4, input device 1200 modulates the reference voltage rails 211 in order to perform capacitive sensing using the reference voltage modulator 226. In one embodiment, the timing controller 220 opens the switches 210, 212 so that the reference voltage rails 211 are disconnected from the power supply voltages $V_{DD}$ and $V_{GND}$. As mentioned above, disconnecting the power supplies voltages may prevent the modulation signal 228 from adversely affecting other components in the input device 1200 (which are not shown) that also rely on $V_{DD}$ and $V_{GND}$ for power.

The reference voltage modulator 226 includes a central receiver 1205 that acquires resulting signals generated by modulating the reference voltage rails 211. That is, while the modulation signal 228 is active, the central receiver 1205 measures resulting signals from display and/or sensor electrodes 240, 242 in the panel 234. Generally, because the central receiver 1205 is coupled to the reference voltage rails 211, the receiver 1205 may acquire resulting signals from any components in the panel 234 that are electrically coupled (either directly or indirectly) to the voltage rails 211. Referring to FIG. 11, in one embodiment, the resulting signals measured by the central receiver 1205 are affected by the capacitance $C_T$ as well as the capacitances in the ground conditions 1125—i.e., $C_{BC}$, $C_{IG}$, and $C_{BG}$. Moreover, although the central receiver 1205 is shown coupled to the reference voltage rail 211B, in other embodiments, receiver 1205 may be coupled to the upper voltage rail 211A or other power supplies 335. Additionally, the central receiver 1205 does not need to be located on the controller 220 but could disposed on the same integrated circuit as the power management controller 230 or on a separate integrated circuit.

The input device 1200 also includes local receivers 1210 located in the display/sensing panel 234. In one embodiment, each of the local receivers 1210 is coupled to only one of the sensor electrodes in order to measure a local capacitance value corresponding to the panel 234. That is, unlike resulting signals acquired by the central receiver 1205 which are affected by the total capacitance of display/sensing panel 234, the resulting signals measured by the of local receivers 1210 are affected by a local capacitance value for a sub-portion of the panel 234. The shape and size of the sub-portion of the panel 234 may depend directly on the shape and size of the sensor electrode 242 coupled to the local receiver 1210. In one embodiment, a local receiver 1210 may be coupled to multiple sensor electrodes 242. Regardless, the local receivers 1210 measure a capacitance value for only a portion of the sensing region defined by the panel 234 rather than measuring a total capacitance value for the panel 234 like the central receiver 1205.

Although the input device 1200 may measure resulting signals at the central receiver 1205 at a different (non-overlapping) time period than it measures resulting signals at the local receivers 1210, in one embodiment, the central and local receivers 1205, 1210 measure the resulting signals in parallel (e.g., simultaneously measuring both on same local receiver 1205 and on the central receiver 1210). Put differently, when modulating the reference voltage rails 211 using modulation signal 228, both central receiver 1205 and the local receivers 1210 can acquire resulting signals. The resulting signals measured by the central receiver 1205 would include the resulting signals generated by all the sensor electrodes 242 (as well as other components in the panel 234 such as display electrodes 240), while the resulting signals acquired by each of the local receiver 1210 are generated on only one, or a subset, of the sensor electrodes 242 and/or their thresholds. Also, it may be assumed that user inputs and LGM conditions change slowly relative to these measurements. In this manner, even measurements made at overlapping times may be combined to estimate LGM conditions.

Although the resulting signals measured by the central and local receivers 1205, 1210 are different, the measured values are affected equally by the capacitances in the ground conditions 1125 shown in FIG. 11. That is, assuming there are no changes in the arrangement of the input device 1105 relative to the input object 1110 and earth ground 1115 when measuring the total capacitance and when measuring the local capacitances, the ground conditions 1125 for these measurements are essentially the same. Based on this relationship, the input device 1200 in FIG. 12 can use the total capacitance represented by the resulting signals received at the central receiver 1205 in order to normalize the resulting signals received on the local receivers 1210 to mitigate or remove the effect of the ground conditions on the local capacitance measurements.

Figure 13:
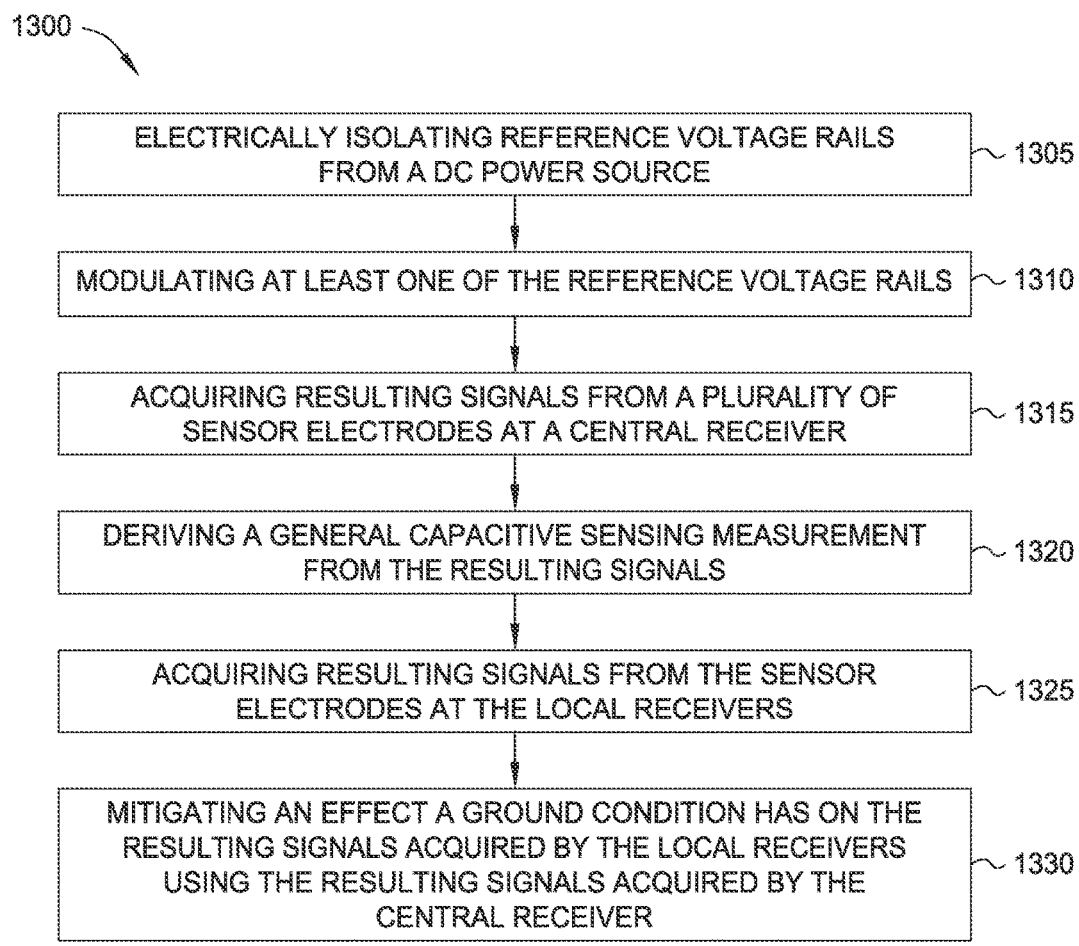
FIG. 13 is a flow chart for mitigating effects of a low ground mass condition, according to one embodiment described herein.

FIG. 13 is a flow chart for a method 1300 of mitigating effects of a LGM condition, according to one embodiment described herein. At block 1305, the timing controller electrically isolates the reference voltage rails from the DC power source (i.e., power supply voltages $V_{DD}$ and $V_{GND}$) by selectively disconnecting or using an indirect coupling technique such as inductive coupling. Referring to FIG. 12, the timing controller 220 uses gate voltages in order to deactivate the switches 210, 212 thereby disconnecting the reference voltage rails 211 from the DC power supply.

At block 1310, the reference voltage modulator generates a signal that modulates at least one of the reference voltage rails. In one embodiment, the modulation is performed with respect to chassis ground (e.g., $V_{GND}$). Thus, to the perspective of the components in the input device that are not connected to the reference voltage rails, the components connected to the modulated reference voltage rail are modulating. However, to the perspective of the components connected to the reference voltage rail, other components in the input device, as well as the input object, appear to be modulating.

Figure 14:
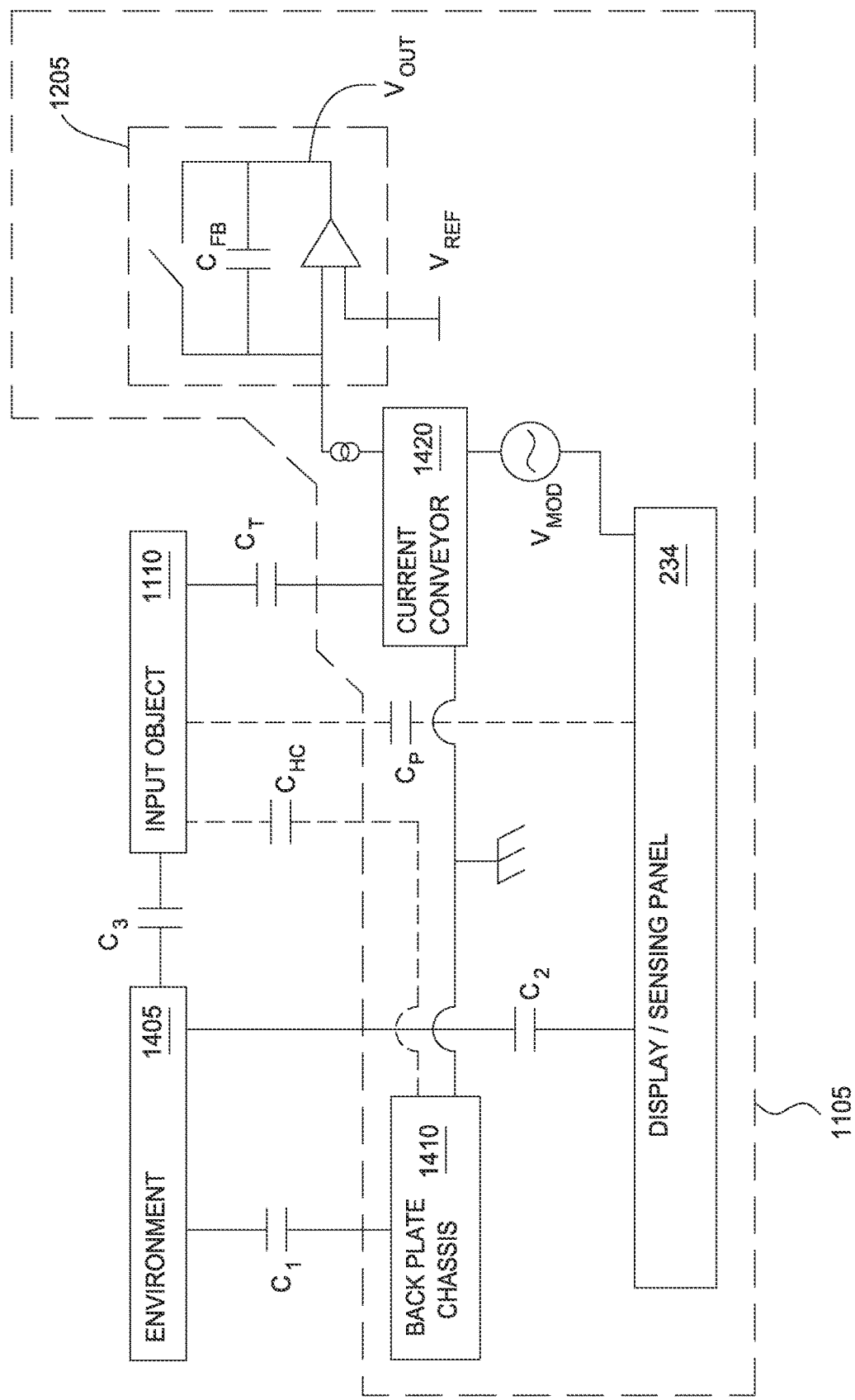
FIG. 14 illustrates various capacitances between an input device and an environment, according to one embodiment described herein.

At block 1315, the central receiver acquires resulting signals from a plurality of sensor electrodes. Because the sensor electrodes may establish a sensing region for the display/sensing panel, by acquiring resulting signals from the sensor electrodes, the central receiver can, at block 1320, derive a general capacitive measurement for the panel from the resulting signals. In one embodiment, the general capacitive measurement may be a current in the input device that is caused by the resulting signals. Alternatively, the general capacitive measurement may a digital signal derived from the resulting signals using an ADC in the central receiver. In one embodiment, the general capacitive measurement is caused by resulting signals generated on all the sensor electrodes in the display/sensing panel and represents a total capacitance of the panel. Moreover, the central receiver may acquire resulting signals from display electrodes and other circuitry in the panel to derive the general capacitive measurement. FIG. 14 illustrates an exemplary system where the general capacitive measurement can be measured by the central receiver.

FIG. 14 illustrates various capacitances between an input device 1105 and an environment 1405, according to one embodiment described herein. In one embodiment, the environment 1405 includes the surrounding area proximate to the input device 1105. For example, the environment 1405 may include objects that the input device 1105 contacts—e.g., a table the device 1105 is resting on or a user's hand that is holding the device 1105—as well as objects that are capacitively coupled to the input device 1105 but may not contact the device 1105 such as input object 1110—e.g., a finger or stylus. In one embodiment, the environment 1405 may include earth ground.

As shown in FIG. 14, different components in the input device 1105 are capacitively coupled to objects in the environment 1405. For example, the environment is capacitively coupled to a back plate chassis 1410 (e.g., $C_1$) and the display/sensing panel 234 ($C_2$). The value of these capacitances may change depending on the location of the input device 1105 in the environment as well as environmental conditions (e.g., humidity). For example, the values of $C_1$ and $C_2$ may change when the input device 1105 is resting on a table versus when it is being held by the user. The capacitances $C_1$ and $C_2$ may define, at least in part, the grounding conditions of the input device 1105. As discussed above, if these capacitances have similar values as the capacitance $C_T$ between the input object 1110 and a current conveyor 1420, a LGM condition can occur.

The capacitance $C_3$ between the environment 1405 and input object 1110 can also affect the ground conditions of the input device 1105. The capacitance $C_3$ may change depending on the input objects location relative to earth ground. For example, the value of $C_3$ may be smaller when the user (who is holding the input object 1110) is standing on an insulative surface rather than standing directly on the earth. Like capacitances $C_1$ and $C_2$, the relative locations of the input object 1110 and the objects in the environment 1405 can change the capacitance $C_3$ and result in a LGM condition which may negatively affect the ability of the input device 1105 to measure $C_T$.

FIG. 14 also includes capacitance $C_{HC}$ between the back plate chassis 1410 (which may be coupled to chassis ground) and the input object which may be part of the ground condition for the input device 1105. For example, if the input device 1105 is a laptop and the input object 1110 is a user, the capacitance $C_{HC}$ may vary depending on whether the input device 1105 is resting on the user's lap or on a table. Moreover, FIG. 14 includes a coupling capacitance Cp between the input object 1110 and the display/sensing panel 234. In addition to being capacitively coupled to the current conveyor 1420 (and a corresponding sensor electrode coupled to the conveyor 1420), the input object 1110 may be coupled to other components in the panel 234 such as display electrodes, other sensor electrodes, source drivers, gate line selection logic, and the like. In one embodiment, the capacitance $C_P$ represents the total capacitance between the input object 1110 and the various components in the panel 234.

The central receiver 1205 is illustrated in this embodiment as an integrator which acquires resulting signals from the display and/or sensor electrodes (as well as other circuitry) in the display/sensing panel 234. The acquired signals are affected by the various capacitances in FIG. 14, and thus, by processing the signals acquired when modulating the reference voltage rails, the central receiver can derive the general capacitive sensing measurement discussed at block 1320 of FIG. 13. Although not shown, the central receiver 1205 may include a demodulator, filter, buffer, and/or ADC for processing the acquired signals and deriving the general capacitive sensing measurement. Note that the current conveyor 1420 and central receiver integrator 1205 serve similar purposes to integrator 500 and integrator 900 previously discussed. Further although 1205 is shown with a reset switch for integrating capacitance $C_{FB}$, it may instead incorporate a low pass filter resistance such as resistor 520 for continuous time sensing, just as integrators 500, 900 may incorporate a reset switch for discrete time sensing. Further note that the current conveyor 1420 may also be used to perform level shifting of the capacitive sensing current to the voltage reference of the integrator 1205 and increase the effective dynamic range of the integrator 1205. A similar current conveyor may also be included into integrators 500, 900 to perform the same functions. Alternately, where the dynamic range of the integrator 1205 is sufficient, current conveyor 1420 may be unnecessary. Currents from the display/sensing panel 234 and the input object (e.g. through the isolated local receiver supplies) may be routed directly to integrator 1205 while its reference $V_{REF}$ is modulated.

The output voltage ($V_{OUT}$) of the integrator 1205 when acquiring resulting signals may be expressed as:

$$V_{Out} = \frac{1}{\alpha c_{FB}} \left[ \frac{c_1 c_3 + (c_1 + c_2 + c_3)c_{HC}}{(c_1 + c_2) + (c_1 + c_2)(c_{HC} + c_P + c_T)} c_T \right] V_{MOD} + V_{REF} \quad (1)$$

The capacitance $C_B$ represents the background capacitance where $C_T = C_F + C_B$. The current through the power modulation supply ($V_{MOD}$) from the display/sensing panel 234 to the back plate chassis 1410 can be represented as:

$$I_1 = \frac{\begin{array}{c} C_{HC}(C_3(C_P + C_T) + C_2(C_3 + C_P + C_T)) + \\ C_1((C_3 + C_{HC})(C_P + C_T) + (C_2(C_3 + C_{HC} + C_P + C_T)))V_{MOD} \end{array}}{\begin{array}{c} C_3(C_{HC} + C_P + C_T) + \\ C_1(C_3 + C_{HC} + C_P + C_T) + C_2(C_3 + C_{HC} + C_P + C_T) \end{array}} \quad (2)$$

Returning to FIG. 13, at block 1325, the input device determines local capacitive sensing measurement from each of the sensor electrodes. That is, instead of acquiring resulting signals from multiple electrodes (e.g., a group of sensor electrodes or both display and sensor electrodes) like the central receiver, the input device may use each local receiver to acquire resulting signals from one sensor electrode. By processing the resulting signals, the local receivers can each determine a local capacitive sensing measurement that represents a localized capacitance value for a portion of the sensing region that includes the sensor electrode to which the local receiver is coupled. Thus, unlike the general capacitive sensing measurement derived by the central receiver, the local capacitive sensing measurements may represent a capacitance for a sub-portion of the sensing region in the display/sensing panel. However, despite this difference between the general and local capacitance measurements, both of these measurements may be equally affected by the ground conditions of the input device. That is, referring to FIG. 14, the capacitances $C_1, C_2, C_3, C_{HC}$ and $C_P$ may have the same effect on the local and general capacitance measurements. Thus, if the values of the capacitances $C_1, C_2, C_3, C_{HC}$ and $C_P$ change, the local and general capacitance measurements change in a corresponding manner.

In one embodiment, the local receivers may acquire resulting signals in parallel with the central receiver acquiring resulting signals. Stated differently, while the input device modulates the reference voltage rail, the local and central receivers both measure resulting signals. Moreover, the local and central receivers may also process the resulting signals in parallel in order to derive the local and general capacitive sensing measurements, but this is not a requirement. One advantage of acquiring the resulting signals on the local and general receivers simultaneously is that the ground conditions are the same (e.g., measured at the same time). If the resulting signals were acquired at different times, the location of the input device in its environment may have changed, thereby changing the ground conditions. As discussed below, if the ground conditions are the same when acquiring resulting signals at both the general and local receivers, then by correlating the signals, the input device can remove the effect of the ground conditions from the local capacitive measurements. However, even if the local and central receivers do not acquire the resulting signals in parallel, any slowing varying change (relative to the rate at which capacitive measurements are taken) in the ground conditions between when the local receiver and central receiver measure the resulting signals may be small, and thus, still permit the input device to correlate the signals to mitigate or remove the effects of the ground conditions.

Using the circuit diagram in FIG. 14 as an example, the current measured to detect touch through $C_T$ at the current conveyor 1420 may be represented as:

$$I_2 = \frac{(C_1 C_3 + (C_1 + C_2 + C_3)C_{HC})C_T V_{MOD}}{\begin{array}{c} C_3(C_{HC} + C_P + C_T) + \\ C_1(C_3 + C_{HC} + C_P + C_T) + C_2(C_3 + C_{HC} + C_P + C_T) \end{array}} \quad (3)$$

The current $I_1$ in Equation 2 between the display/sensing panel 234 and the back plate chassis 1410 is highly correlated with current $I_2$ in Equation 3. For example, each of these currents is dependent on the capacitances $C_{HP}$ and $C_1$. As the arrangement of the input device 1105 in the environment 1405 changes, the capacitances $C_{HP}$ and $C_1$ may cause a LGM condition.

Returning to FIG. 13, at block 1330, the input device mitigates an effect the ground conditions have on the resulting signals acquired by the local receivers using the resulting signals acquired by the central receiver. In one embodiment, the resulting signals measured by the central receiver (or a general capacitive measurement derived therefrom) is used to normalize the resulting signals acquired by the local receives (or a local capacitive measurement derived therefrom). For example, the current $I_2$ in Equation 3 (e.g., a local capacitive sensing measurement) can be normalized by dividing by the current $I_1$ in Equation 2 (e.g., a general capacitive sensing measurement).

$$\frac{I_2}{I_1} = \frac{(C_1 C_3 + (C_1 + C_2 + C_3)C_{HC})C_T}{C_{HC}(C_3(C_P + C_T) + C_2(C_3 + C_P + C_T) + C_1(C_3 + C_{HC})(C_P + C_T) + C_2(C_3 + C_{HC} + C_P + C_T))} \quad (4)$$

The normalized current shown in Equation 4 has smaller dependences to the capacitances forming the ground conditions relative to the dependences in currents $I_1$ and $I_2$ which results in the normalize current not being strongly correlated to the capacitances $C_{HC}$ and $C_1$. Put differently, changes in the values of capacitances $C_{HC}$ and $C_1$, may result in small changes (or no changes) to the normalized current when compared to the changes in the non-normalized currents $I_1$ and $I_2$.

Figure 15:
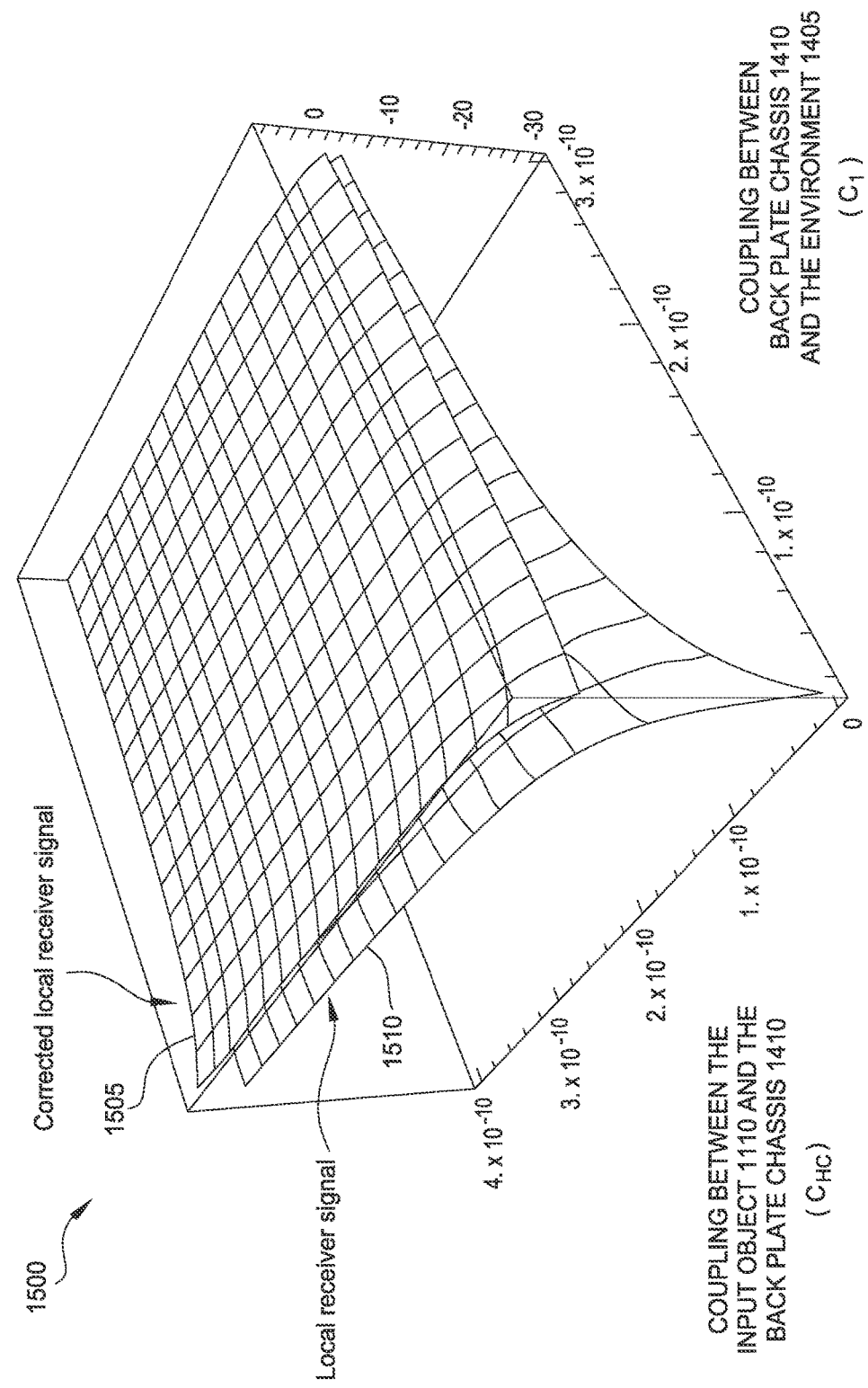
FIG. 15 is a chart representing the results of mitigating the effects of a low ground mass condition, according to one embodiment described herein.

FIG. 15 is a chart 1500 illustrating the results of mitigating the effects of a LGM condition, according to one embodiment described herein. Specifically, an upper plot 1505 illustrates the corrected local receiver signal that has been normalized using the resulting signals acquired by the central receiver while a lower plot 1510 illustrates an uncorrected signal. As shown, the upper plot 1505 is less susceptible to changes in the capacitive coupling between the input object 1110 and the back plate chassis 1410 (i.e., $C_{HC}$) and the capacitive coupling between the back plate chassis 1410 and the environment 1405 (i.e., $C_1$) than the lower plot 1510. Thus, changes in the values of ground condition capacitances $C_{HC}$ and $C_1$ have less of an effect on the normalized capacitive sensing signals in plot 1505 than the un-normalized capacitive sensing signals in plot 1510.

Another advantage of normalizing the local capacitive sensing measurement using the general capacitive sensing measurement is that the normalized signals are not dependent on $V_{MOD}$. Thus, any noise coupled into the voltage used to modulate the reference voltage rails is cancelled out. Even further, normalizing the local and general capacitive measurements may also mitigate noise introduced by objects that cause the ground conditions. For example, referring to FIG. 14, any noise introduced into the input device 1105 via the coupling capacitance $C_1$, $C_2$, $C_3$, $C_{HC}$ and $C_P$ may be cancelled out by correlating the resulting signals acquired by the local and central receivers. Thus, any noise signal introduced by the ground condition capacitances that couple the input device to external objects can be removed.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

The invention claimed is:

1. An input device, comprising:
a plurality of sensor electrodes; and
a processing system, comprising:
  a reference voltage modulator configured to modulate a reference voltage used to provide power to a plurality of power supplies;
  a central receiver electrically coupled to the plurality of sensor electrodes, wherein the central receiver is configured to, when the reference voltage is being modulated, acquire first resulting signals from the plurality of sensor electrodes simultaneously, wherein the central receiver comprises circuitry configured to output, using the first resulting signals, a first capacitive measurement representing a total capacitance of the plurality of sensor electrodes; and
  a plurality of local receivers each coupled to a respective one of the plurality of sensor electrodes, wherein the plurality of local receivers is configured to acquire second resulting signals from the plurality of sensor electrodes, wherein each of the plurality of local receivers comprises circuitry, different from the circuity in the central receiver, configured to output, using at least a portion of the second resulting signals, a second capacitive measurement representing a localized capacitance value for a portion of a sensing region comprising the respective one of the plurality of sensor electrodes coupled to a respective one of the plurality of local receivers,
  wherein the processing system is configured to mitigate an effect a grounding condition has on the second capacitive measurements outputted by the plurality of local receivers using the first capacitive measurement outputted by the central receiver.

2. The input device of claim 1, further comprising:
a controller configured to disconnect the reference voltage from a DC power source while the reference voltage is being modulated.

3. The input device of claim 1, further comprising:
a display/sensing panel comprising the plurality of sensor electrodes, the plurality of local receivers, and a plurality of display electrodes, wherein each of the plurality of sensor electrodes is coupled to only one of the plurality of local receivers.

4. The input device of claim 1, wherein acquiring the second resulting signals on the plurality of local receivers occurs in parallel with acquiring the first resulting signals on the central receiver when the reference voltage is modulated.

5. The input device of claim 1, wherein the central receiver is configured to acquire third resulting signals from a plurality of display electrodes while the reference voltage is being modulated to generate a third capacitive measurement representing a total capacitance of the plurality of display electrodes, and wherein the processing system is configured to mitigate the effect the grounding condition has on the second capacitive measurements outputted by the plurality of local receivers using the third capacitive measurement.

6. The input device of claim 1, wherein the grounding condition is at least one of (i) a first capacitive coupling between an input object interacting with the input device and earth ground and (ii) a second capacitive coupling between the input device and earth ground.

7. The input device of claim 1, wherein the processing system further comprises:

a display module configured to update pixels in a display screen, wherein the display module and the plurality of local receivers are disposed within a common integrated circuit.

8. The input device of claim 1, wherein the processing system further comprises:
a display module configured to update pixels in a display screen, wherein the display module is disposed within a first integrated circuit and at least a portion of the plurality of local receivers is disposed within a second integrated circuit.

9. The input device of claim 1, wherein the plurality of sensor electrodes are disposed in a matrix array.

10. A processing system, comprising:
a reference voltage modulator configured to modulate a reference voltage used to provide power to a plurality of power supplies;
a central receiver electrically coupled to a plurality of sensor electrodes, wherein the central receiver is configured to, when the reference voltage is being modulated, acquire first resulting signals from the plurality of sensor electrodes simultaneously, wherein the central receiver comprises circuitry configured to output, using the first resulting signals, a first capacitive measurement representing a total capacitance of the plurality of sensor electrodes; and
a plurality of local receivers each coupled to a respective one of the plurality of sensor electrodes, wherein the plurality of local receivers is configured to acquire second resulting signals from the plurality of sensor electrodes, wherein each of the plurality of local receivers comprises circuitry, different from the circuitry in the central receiver, configured to output, using at least a portion of the second resulting signals, a second capacitive measurement representing a localized capacitance value for a portion of a sensing region comprising the respective one of the plurality of sensor electrodes coupled to a respective one of the plurality of local receivers,
wherein the processing system is configured to mitigate an effect a grounding condition has on the second capacitive measurements outputted by the plurality of local receivers using the first capacitive measurement outputted by the central receiver.

11. The processing system of claim 10, further comprising:
a controller configured to disconnect the reference voltage from a DC power source while the reference voltage is being modulated.

12. The processing system of claim 10, further comprising:
a power management controller comprising the power supplies, wherein the power supplies are configured to provide power to a display.

13. The processing system of claim 10, wherein acquiring the second resulting signals on the plurality of local receivers occurs in parallel with acquiring the first resulting signals on the central receiver when the reference voltage is modulated.

14. The processing system of claim 10, wherein the central receiver is configured to acquire third resulting signals from a plurality of display electrodes while the reference voltage is being modulated to generate a third capacitive measurement representing a total capacitance of the plurality of display electrodes, and wherein the processing system is configured to mitigate the effect the grounding condition has on the second capacitive measurements outputted by the plurality of local receivers using the third capacitive measurement.

15. The processing system of claim 10, wherein the grounding condition is at least one of (i) a first capacitive coupling between an input object interacting with an chassis containing the processing system and earth ground and (ii) a second capacitive coupling between the chassis and earth ground.

16. A method comprising:
modulating a reference voltage used to provide power to a plurality of power supplies;
acquiring, while modulating the reference voltage, first resulting signals from a plurality of sensor electrodes simultaneously at a central receiver electrically coupled to the plurality of sensor electrodes, wherein the central receiver comprises circuitry that outputs, using the first resulting signals, a first capacitive measurement representing total capacitance of the plurality of sensor electrodes;
acquiring second resulting signals from the plurality of sensor electrodes at a plurality of local receivers, wherein each of the plurality of local receivers is coupled to a respective one of the plurality of sensor electrodes, wherein each of the plurality of local receivers comprises circuitry, different from the circuitry in the central receiver, that outputs, using at least a portion of the second resulting signals, a second capacitive measurement representing a localized capacitance value for a portion of a sensing region comprising the respective one of the plurality of sensor electrodes coupled to a respective one of the plurality of local receivers; and
mitigating an effect a grounding condition has on the second capacitive measurements outputted by the plurality of local receivers using the first capacitive measurement outputted by the central receiver.

17. The method of claim 16 further comprising:
electrically isolating the reference voltage from a DC power supply while the reference voltage is being modulated.

18. The method of claim 16, wherein the first resulting signals are acquired at the central receiver in parallel with acquiring the second resulting signals at the plurality of local receivers.

19. The method of claim 16, further comprising:
acquiring third resulting signals from a plurality of display electrodes simultaneously at the central receiver while modulating the reference voltage to generate a third capacitive measurement representing a total capacitance of the plurality of display electrodes; and
mitigating the effect the grounding condition has on the second capacitive measurements outputted by the plurality of local receivers using the third capacitive measurement.

* * * * *